US008626574B2

(12) United States Patent
O'Kelley

(10) Patent No.: US 8,626,574 B2
(45) Date of Patent: Jan. 7, 2014

(54) REVENUE ADJUSTMENT PROCESSES

(75) Inventor: Charles Brian O'Kelley, New York, NY (US)

(73) Assignee: Yahoo! Inc., Sunnyvale, CA (US)

( * ) Notice: Subject to any disclaimer, the term of this patent is extended or adjusted under 35 U.S.C. 154(b) by 1288 days.

(21) Appl. No.: 11/669,756

(22) Filed: Jan. 31, 2007

(65) Prior Publication Data

US 2007/0179856 A1  Aug. 2, 2007

Related U.S. Application Data

(60) Provisional application No. 60/817,848, filed on Jun. 30, 2006, provisional application No. 60/764,068, filed on Jan. 31, 2006, provisional application No. 60/764,067, filed on Jan. 31, 2006.

(51) Int. Cl.
  *G06Q 30/00* (2012.01)
(52) U.S. Cl.
  USPC .......................................................... 705/14
(58) Field of Classification Search
  USPC ........................... 705/40, 39; 709/231; 707/3
  See application file for complete search history.

(56) References Cited

U.S. PATENT DOCUMENTS

| 7,076,464 | B2 * | 7/2006 | Edmondson et al. | 705/39 |
| 7,085,732 | B2 | 8/2006 | Gould | |
| 7,539,697 | B1 | 5/2009 | Akella et al. | 707/102 |
| 7,975,062 | B2 * | 7/2011 | Krikorian et al. | 709/231 |
| 2004/0103024 | A1 | 5/2004 | Patel et al. | 705/14 |
| 2006/0080239 | A1 * | 4/2006 | Hartog | 705/40 |
| 2007/0067215 | A1 | 3/2007 | Agarwal et al. | 705/14 |

* cited by examiner

*Primary Examiner* — Sara Dagnew
(74) *Attorney, Agent, or Firm* — Brinks Gilson & Lione

(57) ABSTRACT

In a system that provides an open exchange environment to connect business entities through a network, methods, systems, and apparatus, including computer program products, for performing a revenue adjustment process to distribute one of a revenue surplus or a revenue deficit amongst business entities involved in one or more transactions from which the one of the revenue surplus or the revenue deficit originates over a predefined time interval, the performing including identifying a set of business entities involved in the one or more transactions to which the one of the revenue surplus or the revenue deficit is to be distributed; and determining a proportion of the one of the revenue surplus or the revenue deficit to which each business entity of the set is distributed.

29 Claims, 8 Drawing Sheets

REVENUE ADJUSTMENT PROCESSES

CROSS-REFERENCE TO RELATED APPLICATIONS

This application claims priority based on U.S. Provisional Patent Application No. 60/764,068 for "Online Advertising Multi-Network Transaction Method and System" filed Jan. 31, 2006, the disclosure of which is incorporated herein by reference in its entirety; U.S. Provisional Patent Application No. 60/764,067 for "Multi-Network Transaction Method and System" filed Jan. 31, 2006, the disclosure of which is incorporated herein by reference in its entirety; and U.S. Provisional Patent Application No. 60/817,848 for "Revenue Adjustments Processes" filed Jun. 30, 2006, the disclosure of which is incorporated herein by reference in its entirety.

This application is also related to the following co-pending applications, each of which is hereby incorporated herein by reference in its entirety:

U.S. patent application Ser. No. 10/964,961, entitled "System and Method for Learning and Prediction for Online Advertisements," filed Oct. 14, 2004;

U.S. patent application Ser. No. 11/006,121, entitled "Method and System for Pricing Online Advertisements," filed Dec. 7, 2004;

U.S. patent application Ser. No. 11/669,690, entitled "Open Media Exchange Platforms," filed concurrently with this application;

U.S. patent application Ser. No. 11/669,716, entitled "Open Exchange Platforms," filed concurrently with this application;

U.S. patent application Ser. No. 11/669,711, entitled "Global Constraints In Open Exchange Platforms," filed concurrently with this application; and U.S. patent application Ser. No. 11/669,764, entitled "Entity Linking In Open Exchange Platforms," filed concurrently with this application.

BACKGROUND

This description relates to revenue adjustment processes.

Electronic exchanges, including online auctions, have proliferated along with the Internet. These electronic exchanges aim to provide a high degree of trading efficiency by bringing together a large number of buyers and sellers. Such centralized exchanges are focused on directly matching the bids/offers of buyers and sellers, and do not recognize or account for pre-existing relationships or agreements with other exchanges or between parties to the transaction, such as between (i) buyers and sellers, (ii) intermediaries (e.g., brokers, which may be a buyer or seller), or (iii) buyers or sellers and intermediaries.

The proliferation of Internet activity has also generated tremendous growth for advertising on the Internet. Typically, advertisers (i.e., buyers of ad space) and online publishers (sellers of ad space) have agreements with one or more advertising networks (ad networks), which provide for serving an advertiser's banner or ad across multiple publishers, and concomitantly provide for each publisher having access to a large number of advertisers. Ad networks (which may also manage payment and reporting) may also attempt to target certain Internet users with particular advertisements to increase the likelihood that the user will take an action with respect to the ad. From an advertiser's perspective, effective targeting is important for achieving a high return on investment (ROI).

Online advertising markets display inefficiencies when buyers and sellers are unable to transact. For instance, although a publisher may be subscribed to many ad networks, and one or more of those ad networks may transact inventory with other ad networks, only one of the ad networks to which the publisher is subscribed will be involved in selling (e.g., auctioning) a given ad space for the publisher. The publisher, or a gatekeeper used by the publisher, selects or prioritizes which ad network (or advertiser having a direct agreement with the publisher) will serve the impression for a given ad request. Thus, the number of buyers for a given ad request is limited and, similarly, advertisers have limited access to ad requests.

SUMMARY

In a system that provides an open exchange environment to connect business entities through a network, in one aspect, the invention features a computer-implemented method that includes performing a revenue adjustment process to distribute one of a revenue surplus or a revenue deficit amongst business entities involved in one or more transactions from which the one of the revenue surplus or the revenue deficit originates over a predefined time interval. Performing the revenue adjustment process includes identifying a set of business entities involved in the one or more transactions to which the one of the revenue surplus or the revenue deficit is to be distributed; and determining a proportion of the one of the revenue surplus or the revenue deficit to which each business entity of the set is distributed.

Implementations of the invention may include one or more of the following.

Each of the one or more transactions may involve an online advertisement creative to be displayed on a web page associated with one of the business entities of the set. The business entities involved in the one or more transactions may include an advertiser, one or more advertisement networks, and one or more publishers.

The advertiser may have a relationship with a first of the one or more advertisement networks, the relationship being defined in part by a line item related to an online advertisement creative being offered for display on a web page. The line item may include a unit price for the online advertisement creative, the unit price being adjusted based on one of the following units: impressions, clicks, conversions, and revenue.

At least one of the one or more publishers may have a relationship with the first of the one or more advertisement networks. The relationship may be defined in part by a line item related to an online advertisement space of a web page.

At least one of the one or more publishers may have a relationship with a second of the one or more advertisement networks. The relationship may be defined in part by a line item related to an online advertisement space of a web page.

The method of identifying the set of business entities may include excluding, from the set of business entities to which the one of the revenue surplus or the revenue deficit is to be distributed, any publisher that has an exclusive relationship with the second of the one or more advertisement networks.

The method may further include measuring, by the system, an amount of activity related to the online advertisement creative during the predefined time interval. The system-measured amount of activity may be expressed as a value with a unit identifier, the unit identifier being based on one of the following: impressions, clicks, conversions, and revenue.

The method may include receiving a request for a revenue adjustment from an advertiser associated with the online advertisement creative. The revenue adjustment request may provide an advertiser-measured amount of activity, associated with the online advertisement creative over the predefined time interval, expressed as a value with a unit identifier, the unit identifier being based on one of the following: impressions, clicks, conversions, and revenue.

Each of the one or more transactions involves a particular product, commodity or service that is being offered for purchase or sale by a first of the business entities. The method may include identifying a system-measured aggregate amount of activity associated with the particular product, commodity or service over the predefined time interval. The method may include measuring, by the system, the amount of activity associated with the particular product, commodity or service for each of the business entities of the set over each of one or more portions of the predefined time interval. The method may include receiving a request for a revenue adjustment from the first of the business entities, the revenue adjustment request identifying a first-entity-measured aggregate amount of activity associated with the particular product, commodity or service over the predefined time interval.

The method for determining a proportion of the one of the revenue surplus or the revenue deficit to which each business entity of the set is distributed may include calculating a weighted adjustment; and for each business entity, generating an interval-based activity amount disparity by applying the weighted adjustment to a system-measured amount of activity associated with the particular product, commodity or service for that business entity during each of the one or more portions of the predefined time interval; and determining the proportion of the one of the revenue surplus or the revenue deficit to which the business entity is distributed based on the interval-based activity amount disparity generated for each of the one or more portions of the predefined time interval. The weighed adjustment may be calculated according to the formula $(x-y)/y$, where x is a value that represents a first-entity-measured aggregate amount of activity associated with the particular product, commodity or service over the predefined time interval, and y is a value that represent a system-measured aggregate amount of activity associated with the particular product, commodity or service over the predefined time interval.

Other general aspects include other combinations of the aspects and features described above and other aspects and features expressed as methods, apparatus, systems, computer program products, and in other ways.

Other features and advantages will become apparent from the description and the claims.

DETAILED DESCRIPTION

Figure 1:
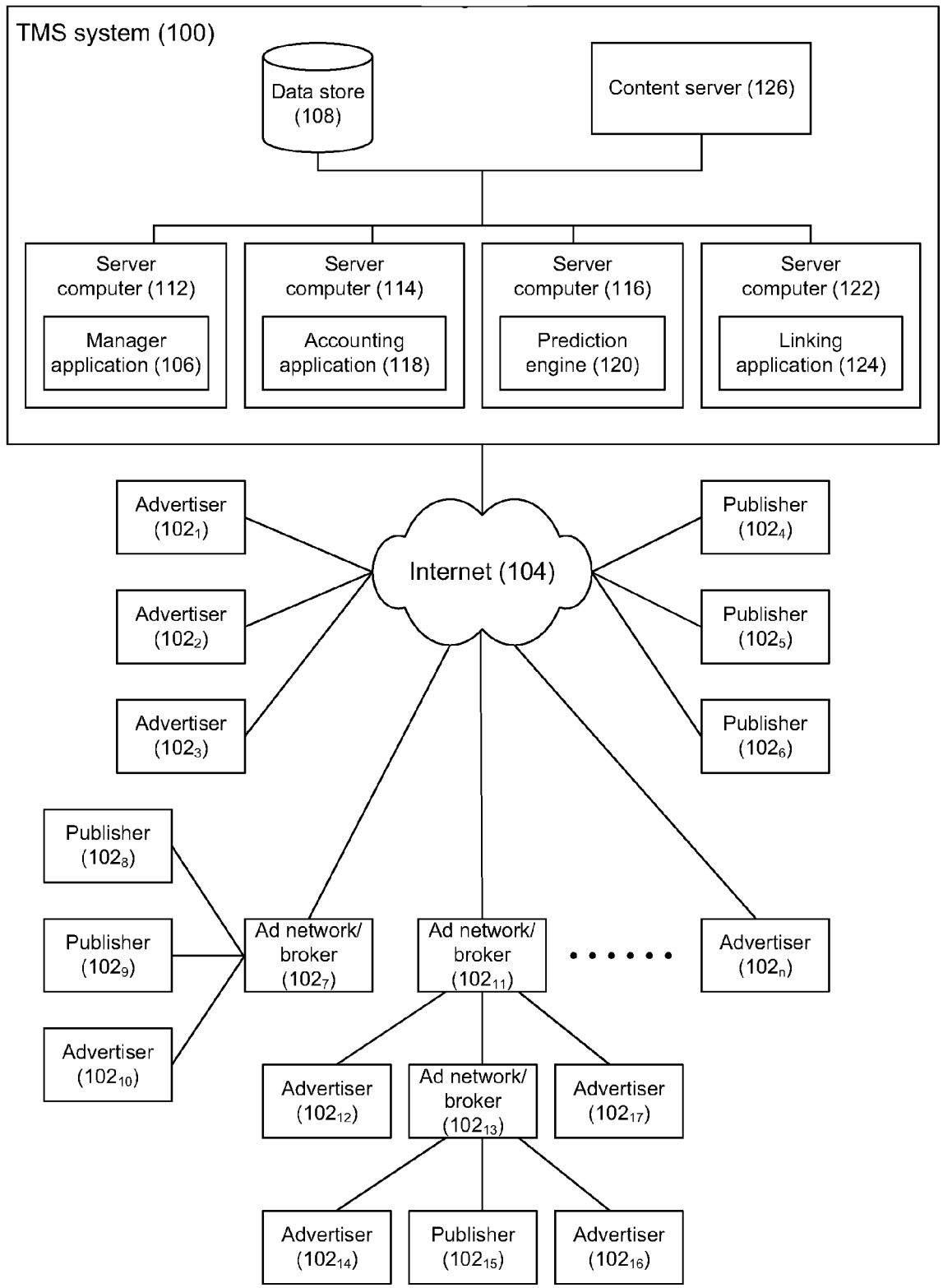
FIG. 1 shows a block diagram of an open media exchange environment.

Referring to FIG. 1, a transaction management system 100 provides an open exchange environment that connects business entities $102_{1 \ldots n}$ through a network. Although the network is depicted as the Internet 104, the network may include any configuration of public and/or private networks.

The transaction management system 100 is implemented as a multi-server system having a server computer 112 that runs a computer program application ("manager application 106") to facilitate commercial transactions between the business entities $102_{1 \ldots n}$, a server computer 114 that runs a computer program application ("accounting application" 118) to track and manage accounting activity associated with the commercial transactions, and a server computer 116 that runs a computer program application ("prediction engine" 120) to generate one or more predictive metrics for use by the manager application in facilitating a commercial transaction. Other server computers and/or applications may also be included in the transaction management system 100. Further, although depicted as separate server computers, in some implementations, one or more of the applications run on a single server computer.

Each commercial transaction involves a first business entity (referred to as "end buyer") that has been selected by the transaction management system 100 to acquire a product (e.g., goods and/or services) that is being offered for acquisition by a second business entity (referred to as "end seller"). The end buyer is selected from amongst a set of business entities eligible to participate in the commercial transaction involving the given product. In some instances, the end seller and the end buyer are the only two business entities involved in the commercial transaction, and are said to be directly linked. In some instances, one or more other business entities (referred to as "intermediaries") are involved in the commercial transaction, and the end seller and the end buyer are said to be indirectly linked by way of the one or more intermediaries. Each intermediary functions as both a buyer (with respect to the end seller or another intermediary) and a seller (with respect to the end buyer or another intermediary) in the commercial transaction.

Typically, the compensation afforded to the end seller by the end buyer for the acquisition of the product comes in the form of a monetary payment. Where there is a direct link between the end buyer and the end seller, the entirety of the monetary payment may be provided to the end seller. In those instances in which one or more intermediaries are involved in the commercial transaction, revenue sharing agreements or flat fee arrangements between the various business entities may result in the end seller only being provided with a fraction of the monetary payment. In some implementations, the transaction management system 100 itself takes a portion of the monetary payment as a commission for facilitating the transaction.

In the examples to follow, the transaction management system 100 is described in the context of an advertisement ("ad") exchange in which the product being offered for acquisition is an ad space on a web page, the end seller is a publisher of the web page, and the end seller is an advertiser having an ad campaign with at least on ad creative dimensioned to fit the ad space on the web page.

In other examples, the end seller may be an ad broker/network aggregating publisher sites of which one includes the ad space that is being offered for acquisition, and the end buyer may be an ad broker/network aggregating advertisers of which one has an ad campaign with at least one ad creative dimensioned to fit the ad space being offered for acquisition. In those instances in which the end buyer is an ad broker/network, the end seller may have no knowledge of the identity of the advertiser with whom it is to engage in a commercial transaction with. The end seller simply transacts with the ad broker/network in its capacity as a representative of an advertiser. Likewise, in those instances in which the end seller is an ad broker/network, the end buyer transacts with the ad broker/network acting in its capacity as a representative of a publisher.

An ad broker/network may have exclusive relationships, non-exclusive relationships, or some combination of both with publishers and/or advertisers. Generally, the publisher and/or advertiser with whom the ad broker/network has an exclusive relationship participates in the ad marketplace only by way of the ad broker/network.

An ad broker/network may also have exclusive relationships, non-exclusive relationships, or some combination of both with other ad brokers/networks. In those instances in which an ad broker/network (e.g., "ad broker/network $102_{13}$") has an exclusive relationship with another ad broker/network (e.g., "ad broker/network $102_{11}$"), ad broker/network $102_{13}$ may participate in the ad exchange only by way of ad broker/network $102_{11}$.

To participate in the ad exchange, each business entity $102_{1 \ldots n}$, may be required to register/subscribe with the transaction management system 100. As part of the registration/subscription process, a business entity may be requested to provide profile information introducing itself to other entities with a brief description of the business entity, letting others know of their targeting or partnering preferences and/or needs (e.g., channels for publishers, offer types for advertisers), and contact information. Information may also include payment terms, payment types, content types, channels, creative types, offer types, and cancellation policies. The profile information may define the entity's primary and/or secondary profile(s).

In addition to the profile information, the business entity may be requested to provide information about the business relationships it has established with one or more other entities. Generally, a business relationship is defined by a contractual agreement that has been negotiated and agreed upon by the two entities. The agreement may take the form of a series of line items, where each line item is related to an agreement that has been negotiated between two business entities with regards to a given product that is being offered for acquisition or that the entity is interested in acquiring.

A line item may include product-related information such as attribute information, price information, and constraint information. Generally, the attribute information relates to qualitative and/or quantitative characteristics of the product. As an example, the attribute information of a line item negotiated between a publisher and an ad broker/network may include the physical dimensions of an ad space being offered for acquisition and the uniform resource locator (URL) of the web page on which the ad space is located, while the attribute information of a line item negotiated between an advertiser and an ad broker/network may include the physical dimensions of an ad space that the advertiser is interested in acquiring given the physical dimensions of at least one ad creative of the advertiser's ad campaign.

The price information generally represents a utility function for the product. For instance, the utility function may assign value with respect to the product's attributes and/or other actions that may be taken with respect to the item. Returning to the advertisement space example, different values may be assigned to a consumer viewing the ad, clicking through on the ad, or taking some other specifically defined action (e.g., making a purchase) in response to an ad beyond simply clicking on it. Such values are commonly referred to in the online advertising context as cost-per-action (CPA), cost-per-impression (CPI), cost-per-click (CPC), cost-per-thousand-impressions (CPM), and return-on-investment (ROI). In some instances, business relationships between entities may include pre-negotiated discounts to be applied, reporting requirements, and penalties or stipulations relative to the failure to deliver an ad creative. The price information may also specify the terms of revenue sharing agreements between entities.

The constraint information generally relates to information that includes or excludes eligibility for a transaction. For instance, these constraints may involve hard limits on geography, time and location of delivery, minimum quantity, minimum acceptable price, etc. In the case of a memory chip market, for example, characteristics such as access times, capacity, operating voltage, power consumption, temperature limits, expected life, and/or other quality characteristics may be attributes, while some of these may alternatively or additionally be constraints. In the advertisement space example, constraint information may include information related to the language of the text displayed on the web page, nature of the content being displayed on the web page, minimum hit count of the web page, geographical focus of the web page content, beginning and ending dates, to name a few. The entity may establish different constraints for different business entities or sets of entities based on the business relationships that exist between the entities. In some instances, the quantity or measure of a product may be specified by the business entity offering the product for acquisition and possibly also by the business entity interested in acquiring the product. In some instances, however, the quantity or measure of the product is implicit in the transaction, being known a priori by sellers, buyers, and intermediaries.

If desired, a business entity may provide to the transaction management system 100 global constraint information that serves to override any line item-based constraint information. In one example, a publisher may set a global constraint that bars all advertisers of adult content or foreign-based content from acquiring ad space on any of the publisher's web pages. In another example, an advertiser may set a global constraint that requires all of its ad creatives to be displayed only in ad spaces of web pages having English language text. By enabling a business entity to enter such global constraint information, various advantages may be achieved. For example, time is saved in that the business entity does not have to repeatedly enter the same constraint information each time a new line item is added. Furthermore, there is no concern that any constraint that the entity would like to have in place may be accidentally left out of one or more line items. In some instances, an entity may desire to provide specific exceptions to a global constraint based on targeting or partnering requirements and/or needs. Returning to the publisher example, a global constraint that bars all advertisers of adult content from acquiring ad space on any of the publisher's web pages may be placed in the publisher's primary profile, and a global constraint exception allowing all advertisers of adult content from acquiring ad space on a specified set of the publisher's web pages may be placed in the publisher's secondary profile.

The information provided by the business entities may be stored in a data store 108 (e.g., a database) coupled to the transaction management system 100 or accessible by the transaction management system 100 via a network (e.g., the Internet 104, a local area network, or a wide area network).

Figure 2:
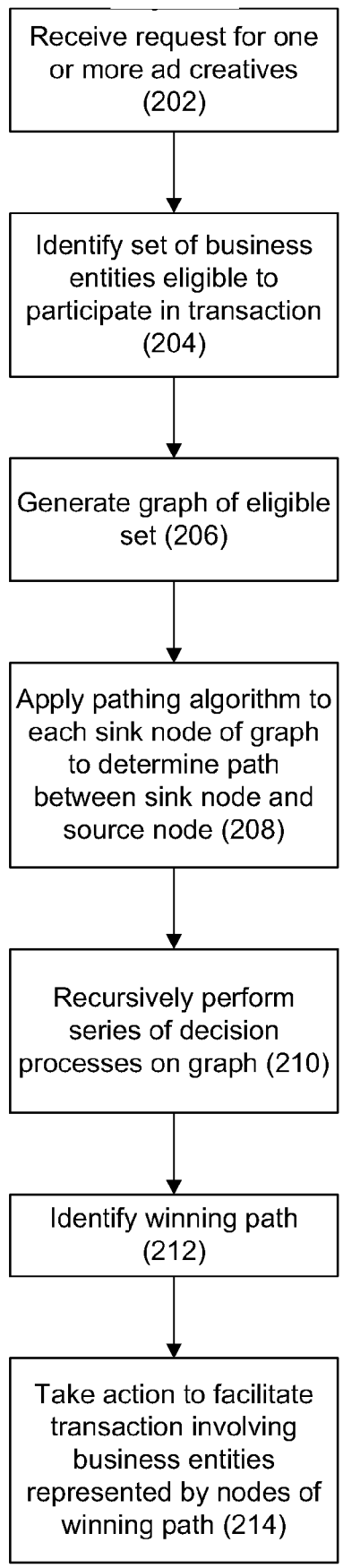
FIG. 2 is a flowchart of a process for facilitating an online advertisement transaction.

FIG. 2 shows a process 200 suitable for implementation by a web-based application (e.g., "manager application 106") of the transaction management system 100. First, the manager application 106 receives (202) a request for one or more ad creatives to be displayed on a web page. In one example, when a consumer at a client computer 110 navigates to a web page of a publisher that is registered with the transaction management system 100, the publisher transmits web page information, such as a compilation of hypertext markup language (HTML) code, JavaScript, Java applets, graphic image files (e.g., GIF, JPEG), etc., that is used by a web browser on the client computer 110 to render the requested web page. As part of this compilation of web page information, the publisher sends a tag (e.g., applet tag) that identifies, depending on the implementation, either an intermediary or the manager application 106 for providing the ad creative. Using the received tag, the client computer 110 either sends a message to the intermediary or the manager application 106 to request the insertion of one or more ad creatives in the web page. In those instances in which the message is sent to an intermediary, that intermediary redirects the request to the manager application 106.

Generally, the ad request includes a URL identifier that identifies the web page to which the consumer has navigated. The manager application 106 may use the URL identifier to search its data store for information related to that web page, including the number of ad spaces available on the web page and the product-related information for each of those ad spaces. In some implementations, if the client computer 110 had previously interacted with the manager application 106, the client computer 110 may also send (as part of the ad request) a previously-stored cookie, which provides some historical data related to the consumer's actions with respect to ad creatives. As an example, the manager application 106 may use such historical data to calculate the probability that the consumer will take an action with respect to a particular type of ad creative. If no cookie was received along with the ad request, a prediction engine 120 of the transaction management system 100 may perform such a probability calculation using external statistical data. As an example, the prediction engine 120 may generate a predictive metric relating to one or more attributes relating to the product being offered for acquisition. For instance, in the sale of metals, a predictive metric of quality may be generated based on historical data for the supplier. In the online advertising context, one example predictive metric (discussed further below) is the probability that a website consumer will take an action with respect to an ad impression. Such predictive metrics may be used in establishing pricing with respect to eligible buyers. Such predictive metrics may facilitate commoditizing an item at least inasmuch as the prediction may provide buyers with information as to an unknown parameter associated with item differentiation, thus providing buyers with sufficient information describing the product for making a buying decision.

For each ad space that is available on the web page, the manager application 106 uses information stored in the data store 108 related to all of the business entities registered with the transaction management system 100 to identify (204) a set of business entities ("eligible set") eligible to participate in a transaction with the end seller involving that ad space. Constraints defined by line-item based constraint information, global constraint information and/or global constraint exception information, for example, may be used to exclude or include particular business entities. As an example, the manager application 106 may use the physical dimensions of the ad space to exclude from the eligible set all business entities that do not have at least one ad creative dimensioned to fit that ad space. The manager application 106 may also use the minimum acceptable price for the ad space to exclude all business entities that are unwilling to submit or are otherwise unwilling to participate in a transaction involving a bid price that meets or exceeds that minimum acceptable price. In the description to follow referencing the examples of FIGS. 4-8, it will be apparent that instances of a "minimum acceptable price" may be estimated effective CPM prices.

Figure 3:
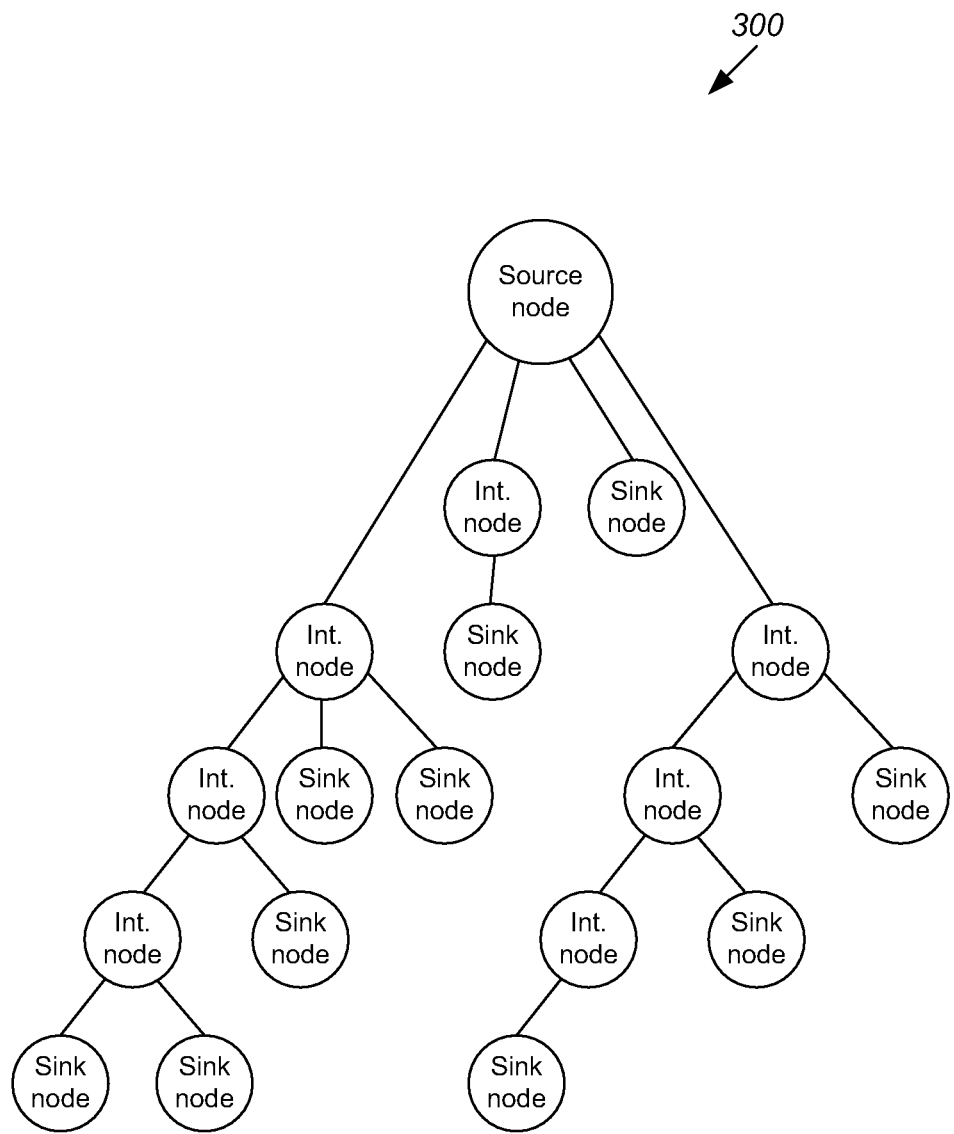
FIG. 3 schematically depicts an environment in which a transaction management system provides a platform for facilitating online advertisement transactions.

The manager application 106 then uses the information stored in the data store 108 defining business relationships between the entities of the eligible set to generate (206) a graph of the eligible set. One example of such a graph 300 is shown in FIG. 3. Each business entity of the eligible set is represented in the graph 300 by a node, and each relationship between a pair of business entities of the eligible set is represented by an edge (visually depicted by a solid line) of the graph 300. One of the nodes of the graph 300, designated as a source node, represents the end seller. One or more of the nodes of the graph 300, each designated as a sink node, represents a potential end buyer. Disposed between a sink node and the source node may be one or more interior nodes (or "int. node"), each representative of an intermediary.

Once the graph 300 of the eligible set is generated, the manager application 106 performs a series of decision processes to identify one of the business entities in the eligible set represented by a sink node to execute the transaction with the business entity represented by the source node. In one implementation, the manager application 106 first applies (208) a pathing algorithm (e.g., a shortest path algorithm) to each sink node of the graph 300 to determine a path between that sink node and the source node.

The manager application 106 then recursively performs (210) a series of decision processes at the non-sink nodes (i.e., interior nodes and source node) of the graph 300 to identify (212), from amongst all of the paths, the path ("winning path") that provides the end seller with the best price for the ad space under the pricing rules that are employed by the manager application 106. Examples of different ways in which the manager application 106 may recursively perform a series of decision processes are described below with reference to FIGS. 4-8. Generally, at each non-sink node of the graph 300 at which a decision process is performed, the manager application 106 takes the bids associated with the child nodes of the given non-sink node ("below" referring to a direction moving away from the source node towards the sink node(s) along a path), normalizes them or otherwise makes them comparable with one another on a common scale, and compares them to identify a winning bid. In some instances, if the comparison yields a tie result, one or more additional comparisons may be performed based on one or more of the following metrics: a priority metric, an advertiser value metric, and a percentage delivered metric, until a tie-breaking result is obtained. In some instances, if the comparison yields a tie result, the manager application 106 randomly selects one of the bids to yield a result and moves on. Although in most instances, the "winning bid" is the bid which is associated with the highest dollar value and the "best price" for the ad space is the price which yields the highest revenue for the end seller, there are instances in which the "winning bid" and the "best price" are based on other metrics (e.g., ad frequency or queue).

The recursive nature of the manner in which the manager application 106 performs the series of decision processes means that the manager application 106 may traverse up and down any given path of the graph 300 from a sink node to the source node before the winning path is identified. In identifying the winning path, the manager application 106 not only identifies the ad creative which is to be delivered to the consumer for overlay onto the ad space of the web page, the manager application 106 also identifies how revenue (if any) is to be divided between the various business entities involved in the transaction.

The manager application 106 may take any action (214) to facilitate the execution of the transaction. In some instances, a content server 126 of the transaction management system 100 serves the ad creative directly. In some instances, the manager application 106 redirects the ad creative serving to an ad server/broker or advertiser represented by the sink node of the winning path. The manager application 106 typically notifies the end buyer, end seller, intermediary that is represented by a node of the winning path that it is to participate in the transaction. In certain cases, the manager application 106 may need to notify or communicate information to one or more third parties that are required for effecting the transaction.

The accounting application 118 may include a logging module that logs the results of the execution of the transaction. Such results may include the amount of revenue that each business entity involved in the transaction receives, the identities of the ads sent to the consumer, the consumer's responses to those ads (e.g., after the ad creative for a given ad space is delivered and displayed, the consumer may connect to the advertiser's website by clicking through or otherwise selecting the advertisement (e.g., image, icon, etc.), though the consumer may not be able to connect to an advertiser website if the advertisements are not selectable), and data specific to the consumer (e.g., demographic, psychographic, and behavioral data). Any actions (e.g., clickthroughs, conversions) taken by the consumer may be captured and logged by the transaction management system 100 (e.g., by using 1×1 GIF pixels in the ad creatives, etc.).

In some implementations, the transaction management system 100 may also include components (not shown) for providing reporting, traffic management, optimization tools, and campaign management, with these components being accessible to subscribing advertisers, publishers, and ad networks via a web based application interface.

FIGS. 4-8 schematically depict illustrative series of decision processes (sometimes referred to as an "auction process" or a series of "auction processes") that may be executed by the manager application 106 with respect to an advertising network (graph of which is depicted in FIG. 3) for determining the end buyer from among the eligible buyers and, more particularly, for determining which of all eligible ad creatives will be displayed to a consumer 10, the price paid by the end buyer (i.e., the advertiser of the selected creative), and the winning path from the end buyer to the end seller (i.e., the publisher of the webpage on which the selected creative is displayed), in accordance with various embodiments of the present invention.

Although each end buyer (e.g., advertiser) represented by a sink node of the graph 300 may, in fact, have more than one campaign (and associated creative) that qualifies for consideration in the transaction, for purposes of clarity of exposition only, the examples presented in these illustrative embodiments assume that each end buyer has one campaign that qualifies for the transaction.

Pricing may be provided according to any of one or more pricing models, including cost-per-thousand-impressions (CPM), cost-per-click (CPC), cost-per-action (CPA), and may be based on dynamic pricing, pricing based on soft targets, auction-based pricing, ROI goals, and other models. It will be understood that the pricing models presented below are merely for purposes of illustration. Additionally, in accordance with some embodiments of the present invention, transaction management system 100 may provide for subscribers to automatically upload and update their own pricing models (e.g., proprietary pricing models representing the subscriber's utility function with respect to ad space, and which may also depend on information about the consumer 10), which transaction management system 100 calls upon (e.g., a function call) during the auction process. Further, while transaction management system 100 is described as calculating the probability that a consumer 10 will take some action (e.g., click probability), transaction management system 100 may be adapted so that such a probability may be calculated according to a subscriber's own function (e.g., which may be embodied in the subscriber's own pricing function).

As schematically represented in FIGS. 4-8, the relationships between publisher, brokers/networks, and advertisers may be represented in a hierarchical, tree-like configuration. Simply for convenience in exposition, as used herein with respect to the illustrative embodiments in FIGS. 4-8, a given tier in the hierarchical structure refers to nodes (e.g., a publisher, broker/network, advertiser) that are removed from (or coupled to) the publisher via the same number of links, and the tier may be referred to by an ordinal number corresponding to that number of links. For instance, in FIG. 4, the first tier includes only Ad Broker/Network 20; the second tier includes Ad Broker/Network 22, Advertiser 32 and Advertiser 34; and the third tier includes Advertisers 36 and 38.

Also for ease of reference, as used herein, a branching point refers to any given node (e.g., a publisher, broker/network, advertiser) in the hierarchical structure from which two or more branches (i.e., links representing contractual terms) emanate to connect to respective nodes that are in the tier below the given node ("below" referring to the direction of increasing ordinal number of the tiers, corresponding to further downward on the drawing sheets when viewing the figures). Further, the overall auction process may be viewed logically as comprising a series of auctions conducted at each branching point among the nodes connected to and in the tier below the given common branching point, and such auctions within the overall hierarchy are sometimes referred to hereinbelow more concisely as being auctions at a branching point and tier (or, similarly, at a tier and branching point), where the tier is intended to refer to the tier of the bidding nodes connected to an below the common branching point. An auction at a branching point and tier may be referred to by an ordinal number (e.g., "first auction"), and for reference purposes only, as used herein, the first auction refers to the auction at the lowest numbered tier at which auctions occur (it is noted that the ordinal number of the auction is not necessarily equal to the ordinal number of the tier at which the auction occurs). For instance, in FIG. 4, the first auction refers to the auction among the second tier nodes (i.e., Ad Broker/Network 22 and Advertisers 32 and 34, which are connected to a branching point anchored by the node representing Ad Broker/Network 20), and the second auction refers to the auction among the third tier nodes (i.e. Advertisers 36 and 38).

As will be understood by those skilled in the art, the hierarchical auction configuration is well suited for representation by various data structures, and for processing by working from the outermost branches/tiers up to the root. Also, pipelined processing (e.g., for successive tiers) as well as parallel processing (e.g., across branching points (nodes) of the hierarchical auction) may be employed in executing the auction.

Figure 4:
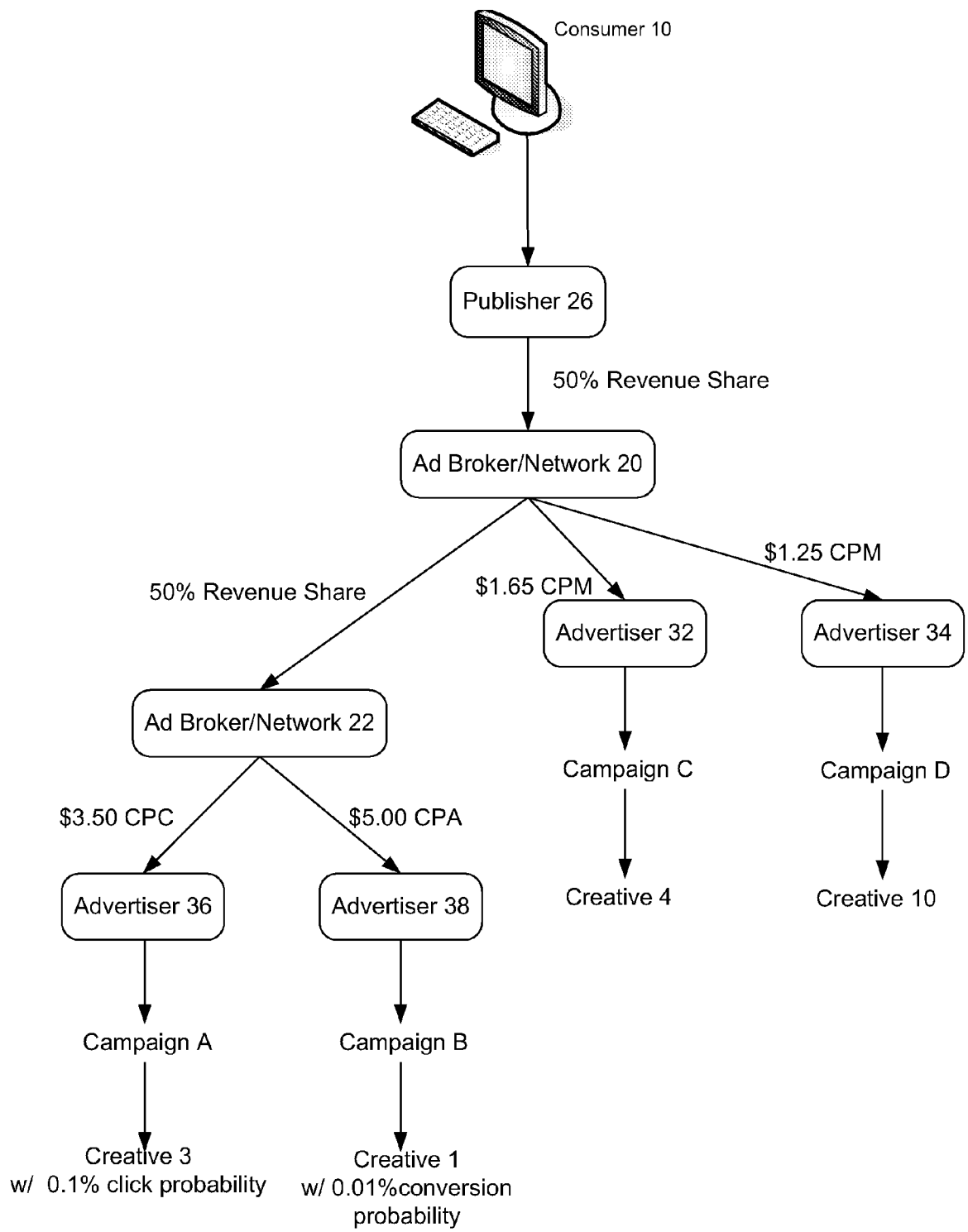
FIGS. 4-8 each schematically depict a hierarchical auction process.

Referring now to FIG. 4, as shown, Advertiser 36 and Advertiser 38 have a $3.50 CPC and $5.00 CPA price agreement with Ad Broker/Network 22. Advertiser 36 has creative 3 of campaign A for which the predictive engine 120 calculates a click probability of 0.1% with respect to consumer 10. Advertiser 36 has creative 1 of campaign B for which Predictive Engine 75 calculates a conversion probability of 0.01% with respect to consumer 10. Accordingly, the third tier auction (i.e., the auction among the third tier entities, which is the second auction in this example) results in an effective CPM (eCPM) of $3.50 for advertiser 36 and $0.50 for advertiser 38, indicating that advertiser 36 is the winner of that tier of the auction. Accounting for the 50% revenue share between ad broker/network 22 and ad broker/network 20, this $3.50 eCPM value becomes $1.75 eCPM when passed up to the second tier where, in the first auction, it is compared to the $1.65 CPM and $1.25 CPM bid prices for advertiser 32 and advertiser 34, respectively. Accordingly, advertiser 36 is the winner of the auction, and creative 3 will be the served impression. Thus, if consumer 10 clicks through on creative 3, ad broker/network 22 will realize $1.75, and the $1.75 passed up to the first tier will be evenly split between Ad Broker/Network 20 and publisher 26. More specifically, advertiser 36 would be subject to paying $3.50 to ad broker/network 22, which would keep $1.75 and be subject to paying $1.75 to ad network 20, which would keep $0.875 and be subject to paying $0.875 to publisher 26. The accounting application 118 will log these amounts into the appropriate accounts stored in data store 108, and actual billing and payment may subsequently occur by any online or offline payment method that have been established.

It may be appreciated by way of this illustrative embodiment that transaction management system 100 provides for more advertisers to partake in such an auction process, thus providing a more efficient market. For instance, in this example, every advertiser is directly involved in the auction. Absent the process and functionality implemented by transaction management system 100, advertisers 36 and 38 would not have been involved in the auction. As may also be appreciated, if publisher 26 were also subscribed with ad broker/network 22, then even if ad brokers/networks 20 and 22 were not linked (e.g., did not have an agreement to transact ad impressions therebetween), transaction management system 100 also would provide the possibility for all advertisers 36, 38, 32, and 34 to partake in the auction process, as all branches between publisher 26 and eligible advertisers are considered (e.g., rather than selecting only one of a plurality of ad brokers/networks with which publisher 26 may have an agreement).

FIGS. 5-8 schematically depict additional illustrative auction processes that may be executed by transaction management system 100 in the advertising network depicted in FIG. 3 and, more particularly, these examples illustrate hierarchical auction processes involving dynamic CPM pricing with CPC targeting, CPM capping, and dynamic CPM pricing reduction.

Figure 5:
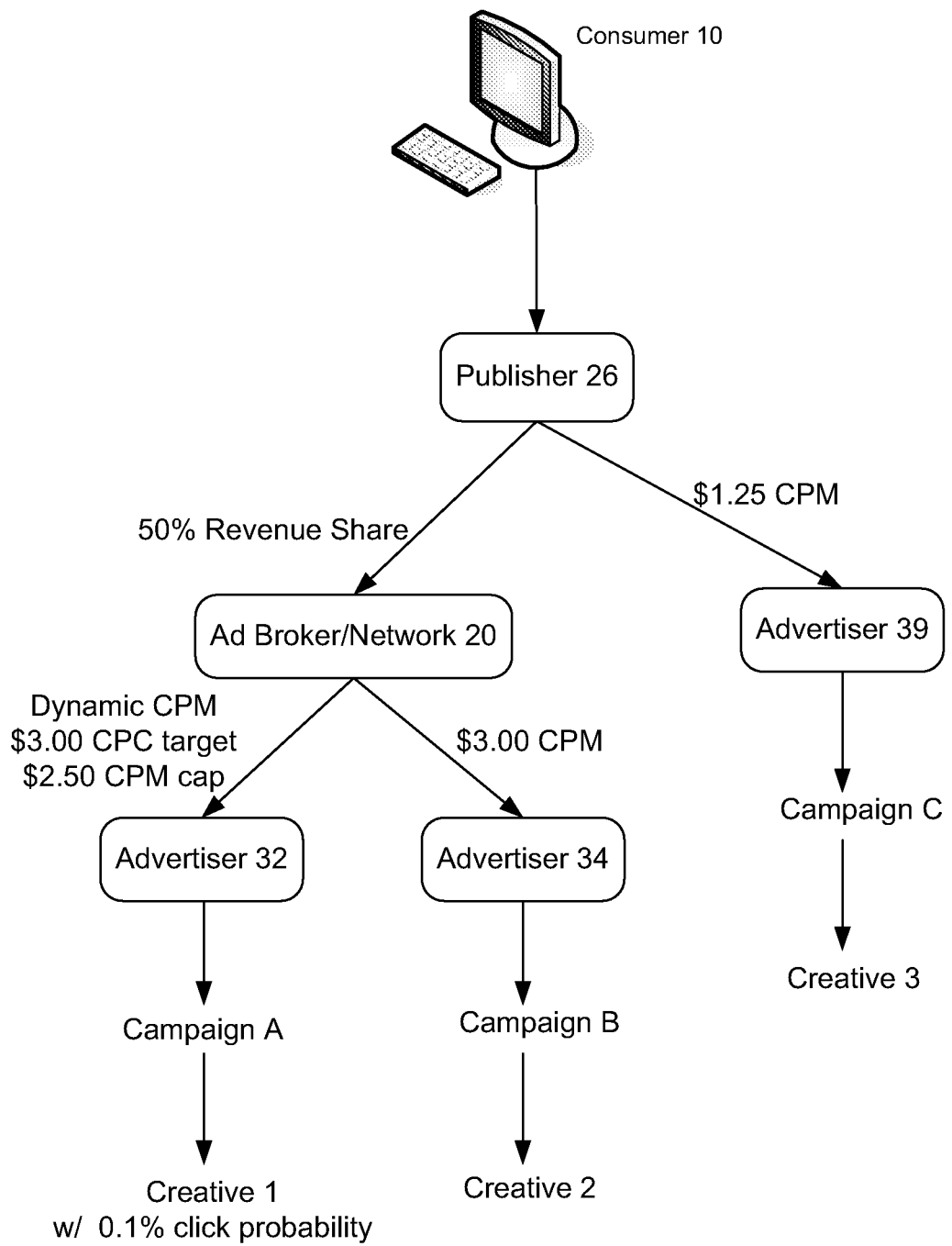

Referring to FIG. 5, publisher 26 has a 50% revenue sharing agreement with Ad Broker/Network 20, and a $1.25 CPM agreement with Advertiser 39, which has campaign C with creative 3. Ad Broker/Network 20 has (i) a $3.00 CPM agreement with Advertiser 34 for campaign B with creative 2, and (ii) a dynamic CPM agreement with Advertiser 32 for campaign A with creative 1, for which advertiser 32 has set a $3.00 CPC target and a $2.50 CPM cap. In accordance with the foregoing, these relationships and underlying terms of agreement are stored by transaction management system 100 as insertion orders and corresponding line items.

In this example, the prediction engine 120 calculates that creative 1 of campaign A has a click probability of 0.1% with respect to consumer 10. Thus, based on the click probability and the $3.00 target CPC, campaign A creative 1 should have an effective CPM (eCPM) of $3.00; however, because there is a $2.50 CPM cap, the eCPM is set at $2.50. Accordingly, this $2.50 eCPM for advertiser 32 loses to the $3.00 CPM of campaign B creative 2 for advertiser 34 at this tier and branching point of the auction. Accounting for the 50% revenue share between ad broker/network 20 and publisher 26, this $3.00 CPM value becomes $1.50 CPM when passed up to the first tier where it is compared to the $1.25 CPM for advertiser 39. Accordingly, advertiser 34 is the winner of the auction, and creative 2 will be the served impression. Thus, for 1000 impressions on campaign B creative 2, advertiser 34 pays $3.00 to ad broker/network 20, which pays $1.50 to publisher 26. The accounting application 118 will log these amounts into the appropriate accounts stored in data store 108.

Figure 6:
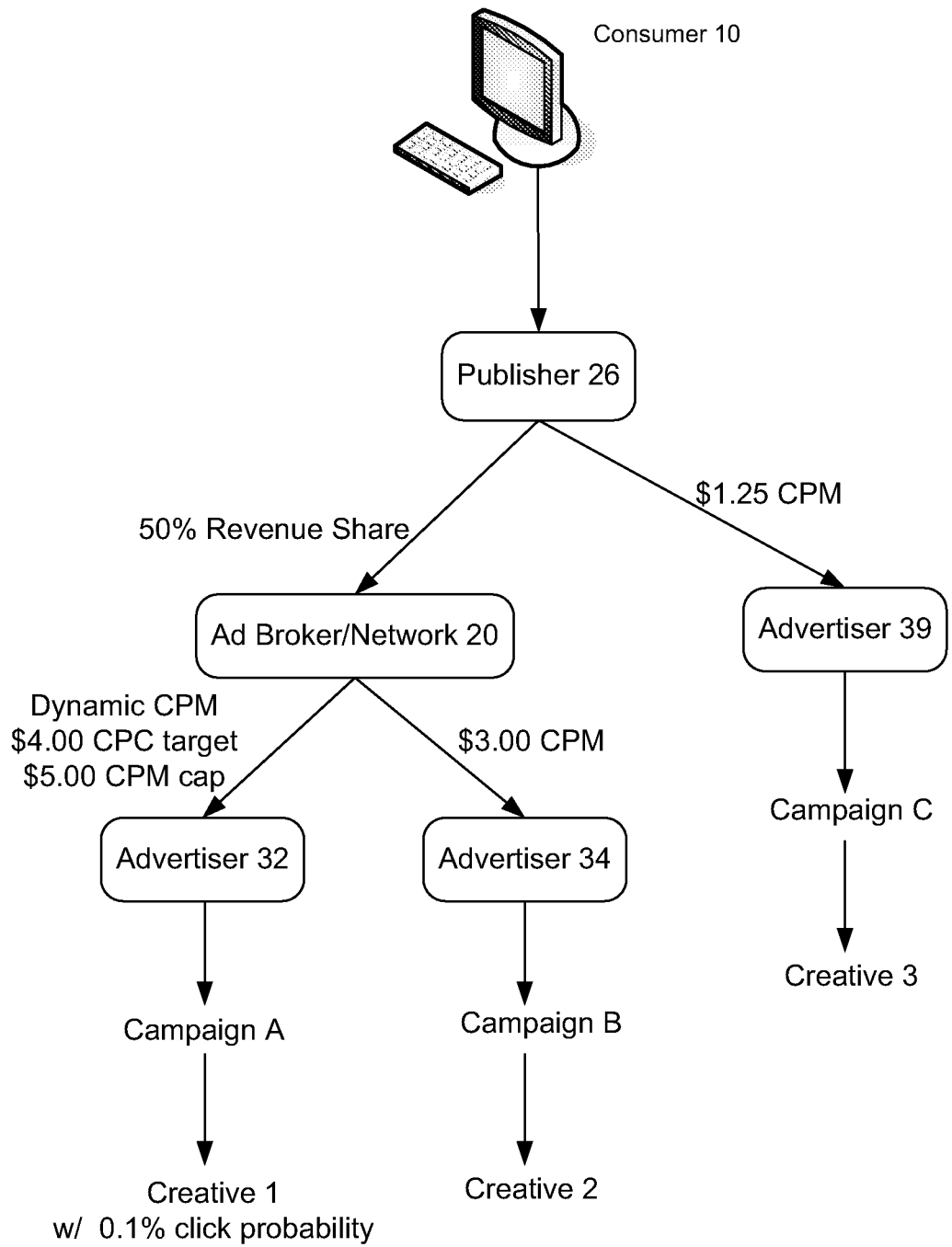

FIG. 6 schematically depicts a scenario similar to that of FIG. 5, except that for the dynamic pricing agreement between Ad Broker/Network 20 and Advertiser 34 (for campaign B with creative 2) advertiser 32 has set a $4.00 CPC target and a $5.00 CPM cap. In this example, transaction management system 100 determines that creative 1 of campaign A has a click probability of 0.1% with respect to consumer 10, and thus the $4.00 target CPC corresponds to a $4.00 eCPM, which is not affected by the $5.00 CPM cap. At the second auction (which, in this case is among the second tier entities), this $4.00 eCPM wins against the $3.00 CPM of advertiser 34 for campaign B creative 2 (which, in this example, is the only other bid price available from other advertisers or networks having a common branching point/node at that tier of the auction). Accounting for the 50% revenue share between ad broker/network 20 and publisher 26, this $4.00 eCPM value becomes $2.00 eCPM when passed up to the first tier where it is compared to the $1.25 CPM for advertiser 29. Accordingly, advertiser 32 is the winner of the auction, and creative 1 will be the served impression.

In this embodiment of the invention, however, a dynamic CPM pricing reduction rule applies wherein the eCPM price actually paid by an auction winner that offers a dynamic CPM price is the lesser of (i) the winning dynamic price and (ii) the amount that the auction winner would have to pay such that the publisher's revenue will equal the publisher revenue that would result from some amount greater (5% in this illustrative implementation) than the second best bid price across the entire auction (i.e., considering all tiers and branching points; considering all line items in the auction). In this regard, the second best bid price means the price bid by a second buyer (i.e., other than the auction winner) in the auction that would result (e.g., accounting for revenue sharing along the path between the second buyer and publisher) in the publisher receiving the second highest revenue compared to the winning bid. It is the bid that would have won the auction but for the winning bid. The amount that the auction winner would have to pay such that the publisher's revenue will equal the publisher revenue that would result from some amount (e.g., 5%) greater than the second best bid price being bid by the second buyer depends on the pricing paths of the auction winner and the second best bidder with respect to the publisher and/or each other.

As may be understood, various methods and algorithms may be implemented by transaction management system 100 for determining the second best bid and applying a dynamic CPM price reduction rule. In one illustrative implementation, for the auctions executed at each tier and branching point, transaction management system 100 not only determines the winner at that tier and branching point, but also the runner up (i.e., next best bid) that may qualify as the basis for the price reduction assuming the winner at that tier and branching point were the overall winner. Various techniques can be employed in the event of a tie for first or second place, such as random selection of the winner(s). transaction management system 100 then includes the winner and any such runner up (accounting for any revenue sharing) in the auction at the next higher branching point and tier (which tier includes the branching point associated with the auction that provided the winner and any such runner up).

More specifically, for the auction at a given tier and branching point, transaction management system 100 does not need to store (or otherwise identify and include in a subsequent auction) the second best bid if the second best bid could not form the basis for a price reduction relative to the winner (best bid) at that tier and branching point. As may be understood, therefore, the second best bid will only qualify as such if its value incremented by the price reduction margin (e.g., 5%) is less than the best bid at that tier and branching point.

Upon completing this auction process over all tiers and branching points, transaction management system 100 thus identifies an overall auction winner (i.e., the buyer/entity whose bid provides the highest revenue to the seller) and runner up (i.e., the buyer/entity whose bid provides the second highest revenue to the seller). Then, based on information stored by transaction management system 100 for the pricing paths for the auction winner and runner up, transaction management system 100 calculates the price that would have to be paid by the auction winner to provide the publisher with the revenue that would be received by the publisher if the runner up's bid were incremented by the margin (i.e., 5% in these examples). If that calculated price is less than the winning bid price, then that calculated price is the reduced price to be paid by the auction winner. Otherwise, the auction winner pays the winning bid price.

It is understood that the foregoing outline of a hierarchical auction process with price reduction according to some embodiments of the present invention is intended to illustrate a basic overall procedure for determining price reduction, and that such auction and sorting type processes for dynamic CPM price reduction may be implemented according to a variety of algorithms which may be subject to myriad possible variations, modifications, and simplifications (e.g., simplifications that apply in certain cases).

Referring now back to FIG. 6, it is understood that the $3.00 CPM of advertiser 34 is the second best bid over the entire auction because under the 50% revenue share agreement between publisher 26 and Ad Broker/Network 20, at the first auction level this $3.00 becomes $1.50 CPM, which is greater than the $1.25 CPM of advertiser 39. Accordingly, because 5% over this second best price (i.e. $3.15 CPM) is less than the winning $4.00 eCPM bid by advertiser 32, the dynamic CPM price reduction is invoked and advertiser 32 actually pays $3.15 CPM rather than $4.00 CPM. Thus, for 1000 impressions on campaign A creative 1, advertiser 32 pays $3.15 to ad broker/network 20 which pays $1.575 to publisher 26.

It is noted that because in this example the second best bid ($3.00 CPM of advertiser 34) is at the same tier and branching point as the winning bid, there are no intervening links (e.g., revenue shares) to account for in calculating the reduced price to be paid by the auction winner. Further, in implementations where a second best bid at a given tier and branching point will only be considered (and passed upwards) if it qualifies for reducing the price of the winning bid at that tier/branching point (e.g., if the second best bid augmented by the margin is less than the winning bid), then if the overall auction results in the winning bid and second best bid originating from the same tier and branching point, then transaction management system 100 knows that the price reduction will be applied without having to compare the winning price with the reduced price. Thus, determining and calculating the price to be paid by the auction winner is simplified for cases in which in the winning bid and second best bid originate from the same tier and branching point.

Figure 7:
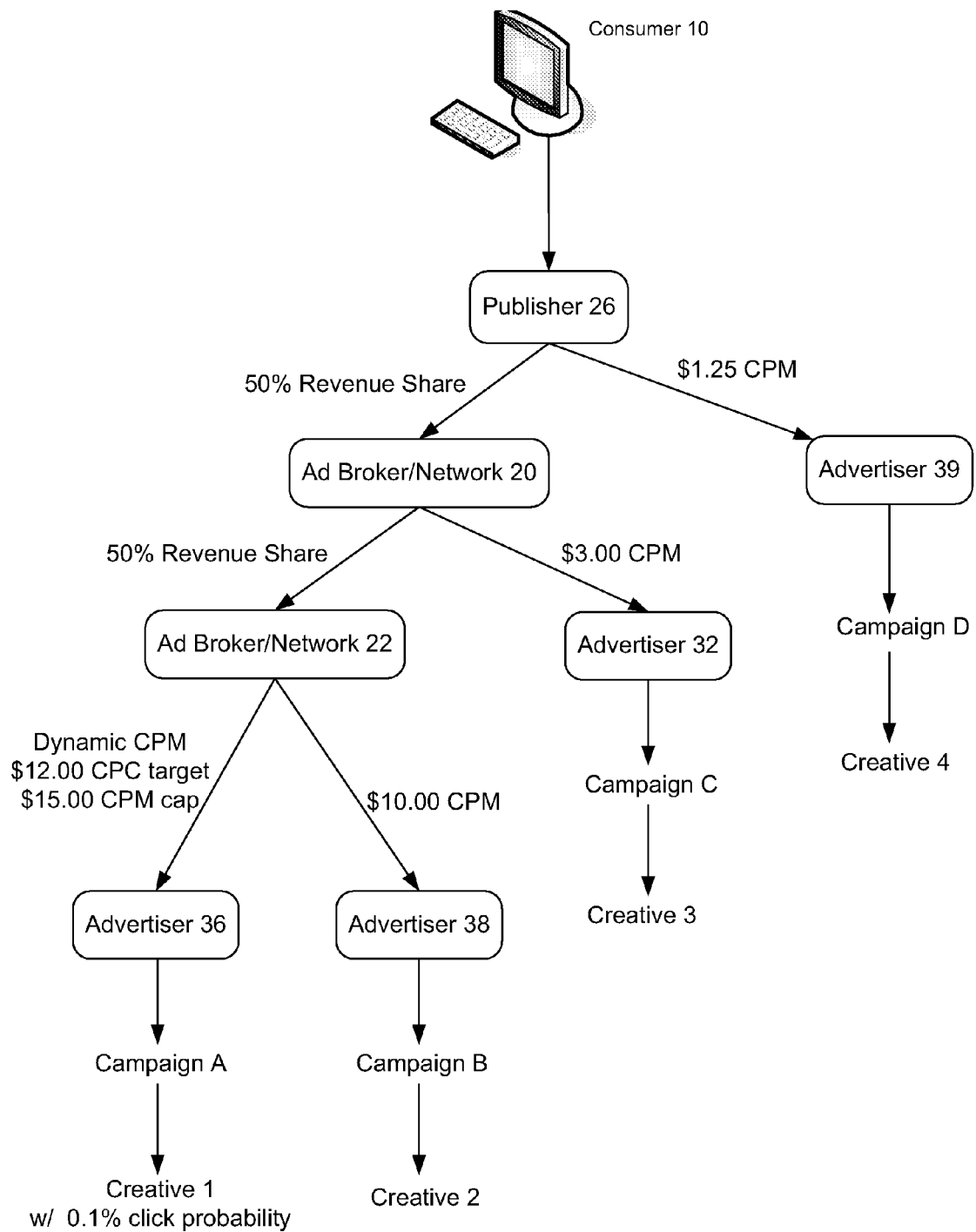

Referring to FIG. 7, publisher 26 has a 50% revenue sharing agreement with Ad Broker/Network 20, and a $1.25 CPM agreement with Advertiser 39, which has campaigns D and E with respective creatives 4 and 5. Ad Broker/Network 20 has (i) a $3.00 CPM agreement with Advertiser 32 for campaign C with creative 3, and (ii) a 50% revenue sharing agreement with Ad Broker/Network 22, which has (i) a $10.00 CPM agreement with Advertiser 38 for campaign B with creative 2, and (ii) a dynamic CPM agreement with Advertiser 36 for campaign A with creative 1, for which advertiser 36 has set a $12.00 CPC target and a $15.00 CPM cap. In accordance with the foregoing, these relationships and underlying terms of agreement are stored by transaction management system 100 as insertion orders and corresponding line items.

In this example, transaction management system 100 determines that creative 1 of campaign A has a click probability of 0.1% with respect to consumer 10, and thus the $12.00 target CPC corresponds to a $12.00 eCPM, which is not affected by the $15.00 CPM cap. This $12.00 eCPM wins against the $10.00 CPM of advertiser 38 for campaign B creative 2, which qualifies as a possible second best bid for price reduction relative to the winning $12.00 eCPM at that level, as 5% over the $10.00 CPM (i.e., $10.50) is less than the winning $12.00 eCPM. Accounting for the 50% revenue share between ad broker/network 20 and ad broker/network 22, when passed up to the second tier, the $12.00 eCPM value of advertiser 36 and the $10.00 CPM value of advertiser 38 become $6.00 eCPM and the $5.00 CPM, respectively, both of which are greater than the competing $3.00 CPM for advertiser 32. Accordingly, the $6.00 eCPM (of advertiser 36) and the $5.00 CPM (of advertiser 38) are passed up to the first tier, competing against the $1.25 CPM of advertiser 39 at $3.00 eCPM and $2.50 CPM, respectively, based on the 50% revenue share between ad broker/network 20 and publisher 26. Thus, advertiser 36 and advertiser 38 are the winning and second place bidders for the overall auction, respectively. As noted above in connection with the example of FIG. 6, if the second winning and second place bidders originated from the same tier and branching point, then it is known that the winner will pay the reduced price and the price reduction calculation is simplified. In this example, therefore, advertiser 36 actually pays $10.50 CPM rather than $12.00 CPM. Thus, for 1000 impressions on campaign A creative 1, advertiser 36 pays $10.50 to ad broker/network 22, which pays $5.25 to ad broker/network 20, which pays $2.625 to publisher 26.

Figure 8:
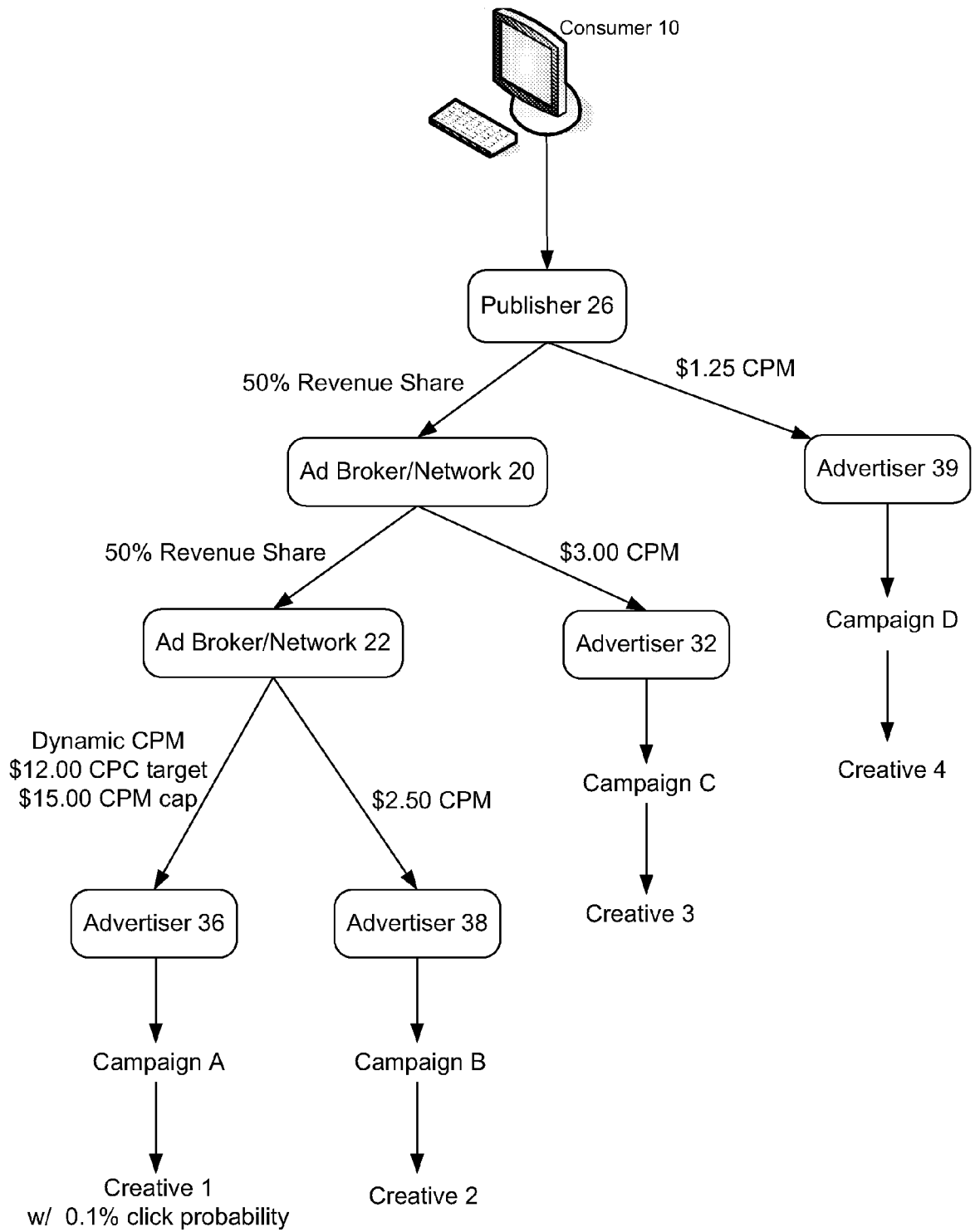

FIG. 8 schematically depicts a scenario similar to that of FIG. 5, except that Ad Broker/Network 22 has a $2.50 CPM agreement with Advertiser 38 for campaign B with creative 2. In this example, transaction management system 100 determines that creative 1 of campaign A has a click probability of 0.1% with respect to consumer 10, and thus the $12.00 target CPC corresponds to a $12.00 eCPM, which is not affected by the $15.00 CPM cap. This $12.00 eCPM wins against the $2.50 CPM of advertiser 38 for campaign B creative 2, which qualifies as a possible second best bid for price reduction relative to the winning $12.00 eCPM at that level, as 5% over the $2.50 CPM (i.e., $2.625) is less than the winning $12.00 eCPM.

Accounting for the 50% revenue share between ad broker/network 20 and ad broker/network 22, when passed up to the second tier, the $12.00 eCPM value of advertiser 36 and the $2.50 CPM value of advertiser 38 compete with $3.00 CPM for advertiser 32 at $6.00 eCPM and the $1.25 CPM, respectively. Thus, at this auction level, the $6.00 eCPM of advertiser 36 wins and the $3.00 CPM of advertiser 32 is the second place winner (beating the $1.25 CPM of advertiser 38) while qualifying as a possible second best bid for price reduction relative to the winning $6.00 eCPM at that level, as 5% over the $3.00 CPM (i.e., $3.15) is less than the winning $6.00 eCPM. Accordingly, the $6.00 eCPM (of advertiser 36) and the $3.00 CPM (of advertiser 32) are passed up to the first tier, competing against the $1.25 CPM of advertiser 39 at $3.00 eCPM and $1.50 CPM, respectively, based on the 50% revenue share between ad broker/network 20 and publisher 26. Thus, advertiser 36 and advertiser 32 are the winning and second place bidders for the overall auction, respectively.

It is noted that in such an implementation where a second best bid at a given tier and branching point will only be considered (and passed upwards) if it qualifies for reducing the price of the winning bid at that tier/branching point (e.g., if the second best bid augmented by the margin is less than the winning bid), then if the overall auction results in the winning bid and second best bid originating from nodes having a common root branch to the publisher, then transaction management system 100 knows that the price reduction will be applied without having to compare the winning price with the reduced price. Thus, in this case, because advertiser 32 (the second place bidder) and advertiser 36 (the winner) are both located on the branch defined by the link between publisher 26 and ad broker/network 20, it is known prior to any further calculation that advertiser 36 will pay a reduced price based on the second place bid.

As noted above, the price to be paid by advertiser 36 is the price that yields publisher 26 the same revenue as if the second best bidder (advertiser 32 in this case) paid the second best bid price augmented according to the price reduction rule (5% in this example), and thus the calculation involves accounting for the respective pricing paths of the winner and second best bidder relative to each other and/or to the publisher. If the overall auction results in the winning bid and second best bid originating from nodes having a common root branch to the publisher, this calculation may be simplified (e.g., compared to cases where the winning bid and second best bid originate from nodes having separate root branches to the publisher). For instance, in the example of FIG. 8, the calculation may consider the shortest pricing path from the second place bidder to the winner (e.g., rather than tracing from the second place bidder to the publisher and then from the publisher to the winner). Thus, accounting for the 50% revenue share between ad broker/network 20 and ad broker/network 22, if advertiser paid $3.15 CPM (i.e., $3.00 CPM plus 5%), then winning advertiser 36 will have to pay $6.30 eCPM for publisher 26 to obtain the same revenue.

In this example, therefore, advertiser 36 actually pays $6.30 CPM rather than $12.00 CPM. Thus, for 1000 impressions on campaign A creative 1, advertiser 36 pays $6.30 to ad broker/network 22, which pays $3.15 to ad broker/network 20, which pays $1.575 to publisher 26.

In some implementations, the transaction management system 100 includes a server computer 122 that runs a linking application 124, which enables business entities to establish links with other business entities that have registered/subscribed with the transaction management system 100. Generally, the linking application 124 enables a first entity to establish links with select other entities thereby building a personalized set of entities with which the first entity will transact through the system 100. In so doing, the first entity may retain control of the entities to which its inventory is directed, while increasing/maximizing the exposure of its inventory to a select set of entities, each of which may compete on equal footing for each item of the first entity's inventory.

The linking application 124 may be implemented as a web-based interface through which a business entity ("initiating entity) may identify another business entity ("target entity") with which the initiating entity desires to partner with.

In one example, the linking application 124 displays a list of business entities that have registered/subscribed with the transaction management system 100. Each entity in the displayed list may be represented by a selectable hyperlink. A person ("entity representative") affiliated with a given initiating entity and authorized by that entity to conduct business on its behalf may view the list of target entities and click on a selectable hyperlink to view profile information for a particular target entity. The entity representative may also search for and/or browse through the profile information of the various registered entities of the list to identify and research target entities with whom a link is to be established.

The linking application 124 displays an icon that the entity representative may click on to send a link request notification to a target entity. Such a notification may be a general invitation expressing an interest to link or a more specific invitation proposing or offering specific terms of line items that will form the basis of a business relationship. Such a notification may be, for example, an e-mail directed to an address identified in the target entity's profile, and/or a message posted to the target entity's online account on transaction management system 100. Such a notification may be initiated by the entity representative based in whole or in part on research conducted through transaction management system 100, though it need not be based on such research (e.g., the entity representative may send such an notification based entirely on his/her own knowledge about and/or desire to work with a particular business entity).

Once a link request notification is sent to the target entity, the linking application 124 creates a pending link in the sending entity's online account. Thus, for example, after an advertiser (publisher) sends such a notification to a publisher (advertiser), the advertiser (publisher) would see the publisher (advertiser) listed on its Publisher (Advertiser) list as a pending link. Until the target entity approves the link, this link will remain inactive.

Upon receiving the notification, the target entity may similarly reply to the message electronically to, for example, accept or decline the invitation, offer a counterproposal, or to further discuss or inquire as to the invitation. Prior to replying, the target entity may research information about the sending entity by browsing profile information available on transaction management system 100. An electronic reply accepting the invitation may constitute a "virtual" handshake to establish a link between the entities.

Once a link is established, the entities may exchange communications by way of the transaction management system 100 or otherwise communicate with each other offline to negotiate and agree upon the terms of the one or more line items that will form the basis of a business relationship between the entities. Such negotiation may involve a series of offers and counteroffers by the parties, though as previously discussed, it is possible that the initial link request notification includes all pertinent details, with the virtual handshake accepting both the establishment of the link as well as the business relationship. Generally, the link between two entities is established only once unless explicitly terminated by one or both of the entities. The link serves as a conduit through which the terms of a business relationship may be defined or continually redefined through the addition, deletion, or modification of line items. The linking application 124 may be implemented to overwrite an entry of the data store 108 that stores the information defining the business relationship each time it is redefined by one or both of the entities.

At any point after a business relationship has been established between two entities and the information defining the business relationship is stored in the data store 108, that business relationship may be used by the manager application 106 when generating a graph of a set of entities eligible to participate in a particular transaction.

This linking application 124 enables ad networks/brokers, publishers and advertisers to partner more easily with each other, and thereby contributes to further enhance the scale and associated efficiency of the exchange provided by transaction management system 100. It is understood that while the transaction management system 100 may advantageously provide an online platform for identifying, researching, and notifying clients with whom a link may be established, alternatively parties may perform one or more of these functions entirely offline, and once an agreement has been reached with regards to the details of a business relationship, line items may be entered into transaction management system 100 by the parties to establish the link.

For ad networks/brokers, linking effectively increases access to both advertisers and publishers otherwise not in their own network. Similarly, advertisers and publishers that are on a given ad network/broker also realize such increased access to advertisers and publishers that are affiliated with a distinct ad network/broker or that are not affiliated with an ad network but are directly subscribed to the transaction management system 100. Concomitantly, advertisers and publishers that are subscribed to the transaction management system platform but not affiliated with an ad network/broker, also realize such increased access to advertisers and publishers that are affiliated with an ad network/broker. This effectively increased access provides for more links to be established, thus creating more competition each time the transaction management system 100 performs a series of decision processes for a given product being offered for acquisition.

As may be appreciated from the foregoing, linking between entities provides many advantages. For instance, for advertisers, linking through the transaction management system 100 eliminates the need to send creatives and link tags for each campaign to media partners and require them to traffic creatives into other ad serving solutions. Once a subscribing advertiser has trafficked its creatives into the transaction management system 100, the same pool of creatives can be used for any publisher that wants to link with that advertiser. Thus, the linking process is greatly simplified, decreasing the time for establishing links by eliminating creative trafficking, and thus also eliminating the possibilities for errors in trafficking creatives.

Consonant with advantages provided to advertisers, publishers similarly benefit from linking with advertisers (and/or other ad networks) by eliminating campaign trafficking from the advertiser and into an ad serving system as well as eliminating click tracking code entry, thus eliminating potential errors, and also allowing campaigns to be set up rapidly (e.g., hours instead of days), thereby decreasing overhead costs while also realizing advertising revenue more quickly.

In the examples described above with reference to FIGS. 4-8, there is an assumption that there is no disparity in terms of the fulfillment of a transaction from the perspectives of the transaction management system 100 and the end buyer. Accordingly, any revenue generated from the fulfillment of a particular transaction may be distributed between the various business entities involved in that transaction in accordance with the revenue sharing and/or flat fee arrangements that exist between the business entities. No revenue surplus or a revenue deficit is ever experienced by the business entities involved in the transaction because the revenue generated is the same as the revenue distributed.

There are, however, instances in which such an assumption would be in error. As an example, the transaction management system 100 may count a redirection of an ad creative serving to its content server 126 as fulfilling a transaction, while the advertiser represented by the sink node of the winning path may only count the actual serving of the ad creative as fulfilling the transaction. If the consumer views the publisher's web page but leaves before allowing the browser to serve the redirect, the ad creative that is being served by the content server may not actually be served to the consumer and will not be counted as such by the advertiser. In other cases, for instance click tracking, the content server may track before the transaction management system. In this case, if the consumer leaves before the click has been executed on both systems, the content server will count more clicks than the transaction management system.

The accounting application 118 may implement revenue adjustment processes to account for such disparities and distribute the revenue surplus/deficit amongst some/all of the business entities involved in the transaction. Examples of revenue adjustment processes will be described with reference to the following scenarios: (1) one-day adjustment with click units; (2) five-day adjustment with click units; (3) one-day adjustment with conversion units; and (4) five-day adjustment with conversion units. Revenue adjustment processes may also be applied in other scenarios involving adjustments with revenue units and adjustments with impression units, as well as scenarios involving different time periods (e.g., month-long).

(1) One-Day Adjustment with Click Units

An advertiser called HeadClick (id 1), within an ad network called HeadNet (id 2), has a line_item (id 3) with the transaction management system 100 that is a cost-per-click (CPC) deal for a particular ad creative ("ad creative M"). According to the CPC deal, each time a consumer clicks on the ad creative M, HeadClick pays $0.50 to the transaction management system 100.

On May 1, 2006, the ad creative M was served on two different websites: a publisher called BigNews (id 5, line_item id 6) within the HeadNet ad network, and a publisher called EasySearch (id 7, line_item 8) within an ad network called Hambone (id 9). There is a line_item (id 10) allowing the HeadNet ad network to send traffic to the Hambone ad network. The accounting application 118 recorded a total of 20 clicks on the ad creative M for May 1, 2006. Specifically, the accounting application tracked the number of times consumers clicked on the ad creative M and generated a network table as shown below (N=Ad network; B=Buyer; S=Seller):

| Day | N (id) | B (id) | S (id) | Clicks | Rev |
|---|---|---|---|---|---|
| May 1 | 2 | 3 | 6 | 15 | 15 * $0.50 = $7.50 |
| May 1 | 2 | 3 | 10 | 5 | 5 * $0.50 = $2.50 |
| | | | May 1 Totals: | 20 | $10.00 |

Note that the 5 clicks recorded on May 1 involving the Hambone ad network represent the 5 times the HeadNet ad network directed traffic to the Hambone ad network in accordance with the line_item (id 10), which resulted in clicks on the ad creative M that was served by the EasySearch publisher in accordance with the line_item (id 8). The revenue ($2.50) resulting from the 5 clicks on the ad creative M that was served by the EasySearch publisher is counted only once in the table. This table shows that on May 1, 2006, $7.50 that was received by the transaction management system 100 from the HeadClick advertiser was passed on to the BigNews publisher, and $2.50 that was received by the transaction management system 100 from the HeadClick advertiser was passed on to the Hambone ad network.

Even though the accounting application 118 recorded a total of 20 clicks for May 1, the HeadClick advertiser recorded 30 clicks for this date. A user (e.g., an employee associated with the HeadClick advertiser or the transaction management system 100) enters a request for an adjustment with click units and a value of 30 through a user interface provided by the accounting application 118.

Once the adjustment request is entered, the accounting application 118 performs a series of computations to determine how the surplus of $5.00 ($15.00–$10.00) is to be distributed amongst the various business entities that functioned as buyers with respect to the HeadNet ad network during the various transactions involving the ad creative M. In this example, the transaction management system 100 only distributes the surplus amongst the business entities that belong to the HeadNet ad network, that is, BigNews publisher and Hambone ad network. The surplus is not distributed to the EasySearch publisher that belongs to the Hambone ad network.

The accounting application 118 first computes the weighted adjustment as follows: weighted adjustment=(# of HeadClick-recorded clicks–# of TMS-recorded clicks)/(# of TMS-recorded clicks)=(30–20)/20=10/20=0.5

The accounting application 118 then computes the adjustments to be made per business entity within the HeadNet ad network on a given day using the weighted adjustment and rounds each result up or down as follows: if the fraction of the result is greater than or equal to 0.5 and the whole number of the fraction is an odd number, round down; if the fraction of the result is greater than or equal to 0.5 and the whole number of the fraction is an even number, round up; if the fraction of the result is less than 0.5 and the whole number of the fraction is an odd number, round down; if the fraction of the result is less than 0.5 and the whole number of the fraction is an even number, round up. After the adjustments and rounding, the accounting application generates an adjusted network table as shown below:

| Day | N (id) | B (id) | S (id) | Clicks | Rev |
|---|---|---|---|---|---|
| May 1 | 2 | 3 | 6 | 15 | 15 * $0.50 = $7.50 |
| May 1 | 2 | 3 | 6 | 15 * 0.5 = 7.5~7 | 7 * $0.50 = $3.50 |
| May 1 | 2 | 3 | 10 | 5 | 5 * $0.50 = $2.50 |
| May 1 | 2 | 3 | 10 | 5 * 0.5 = 2.5~3 | 3 * 0.5 = $1.50 |
| | | | May 1 Totals: | 15 + 7 + 5 + 3 = 30 | $15.00 |

The adjusted network table shows that 30 clicks have been accounted for. $3.50 received by the transaction management system 100 from the HeadClick advertiser is paid to the BigNews publisher; $1.50 received by the transaction management system 100 from the HeadClick advertiser is paid to the Hambone ad network.

(2) Five-Day Adjustment with Click Units

An advertiser called HeadClick (id 1), within an ad network called HeadNet (id 2), has a line_item (id 3) with the transaction management system 100 that is a cost-per-click (CPC) deal for a particular ad creative ("ad creative N"). According to the CPC deal, each time a consumer clicks on the ad creative M, HeadClick pays $0.50 to the transaction management system 100.

On May 1, 2006 through May 5, 2006, inclusive, the ad creative N was served on two different websites: a publisher called BigNews (id 5, line_item id 6) within the HeadNet ad network, and a publisher called EasySearch (id 7, line_item 8) within an ad network called Hambone (id 9). There is a line_item (id 10) allowing the HeadNet ad network to send traffic to the Hambone ad network. The accounting application 118 recorded a total of 40 clicks for the period starting with May 1, 2006 and ending with May 5, 2006, inclusive. Specifically, the accounting application tracked the number of times consumers clicked on the ad creative N and generated a network table as shown below (N=Ad network; B=Buyer; S=Seller):

| Day | N (id) | B (id) | S (id) | Clicks | Rev |
|---|---|---|---|---|---|
| May 1 | 2 | 3 | 6 | 5 | 5 * $0.50 = $2.50 |
| May 1 | 2 | 3 | 10 | 3 | 3 * $0.50 = $1.50 |
| | | | May 1 Totals: | 8 | $4.00 |
| May 2 | 2 | 3 | 6 | 5 | 5 * $0.50 = $2.50 |
| May 2 | 2 | 3 | 10 | 4 | 4 * $0.50 = $2.00 |
| | | | May 2 Totals: | 9 | $4.50 |
| May 3 | 2 | 3 | 6 | 5 | 5 * $0.50 = $2.50 |
| May 3 | 2 | 3 | 10 | 2 | 2 * $0.50 = $1.00 |
| | | | May 3 Totals: | 7 | $3.50 |
| May 4 | 2 | 3 | 6 | 5 | 5 * $0.50 = $2.50 |
| May 4 | 2 | 3 | 10 | 3 | 3 * $0.50 = $1.50 |
| | | | May 4 Totals: | 8 | $4.00 |
| May 5 | 2 | 3 | 6 | 4 | 4 * $0.50 = $2.00 |
| May 5 | 2 | 3 | 10 | 4 | 4 * $0.50 = $2.00 |
| | | | May 5 Totals: | 9 | $4.00 |
| | | | May 1-5 Totals: | 40 | $20.00 |

As before, the clicks recorded on each day involving the Hambone ad network represent the number of time the HeadNet ad network directed traffic to the Hambone ad network in accordance with the line_item (id 10), which resulted in clicks on the ad creative N that was served by the EasySearch publisher in accordance with the line_item (id 8).

Even though the accounting application 118 recorded a total of 40 clicks for the period of May 1-May 5, inclusive, the HeadClick advertiser recorded 50 clicks for this period. A user (e.g., an employee associated with the HeadClick advertiser or the transaction management system 100) enters a request for an adjustment with click units and a value of 50 through a user interface provided by the accounting application 118.

Once the adjustment request is entered, the accounting application 118 performs a series of computations to determine how the surplus of $5.00 ($25.00–$20.00) is to be distributed amongst the various business entities that functioned as buyers with respect to the HeadNet ad network during the various transactions involving the ad creative N. In this example, the transaction management system 100 only distributes the surplus amongst the business entities that belong to the HeadNet ad network, that is, BigNews publisher and Hambone ad network. The shortfall is not distributed to the EasySearch publisher that belongs to the Hambone ad network.

The accounting application 118 first computes the weighted adjustment as follows: weighted adjustment=(# of HeadClick-recorded clicks−# of TMS-recorded clicks)/(# of TMS-recorded clicks)=(50−40)/40=10/40=0.25

The accounting application 118 then computes the adjustments to be made per business entity within the HeadNet ad network on a given day using the weighted adjustment and rounds each result up or down as follows: if the fraction of the result is greater than or equal to 0.5 and the whole number of the fraction is an odd number, round down; if the fraction of the result is greater than or equal to 0.5 and the whole number of the fraction is an even number, round up; if the fraction of the result is less than 0.5 and the whole number of the fraction is an odd number, round down; if the fraction of the result is less than 0.5 and the whole number of the fraction is an even number, round up. After the adjustments and rounding, the accounting application generates an adjusted network table as shown below:

| Day | N (id) | B (id) | S (id) | Clicks | Rev |
|---|---|---|---|---|---|
| May 1 | 2 | 3 | 6 | 5 | 5 * $0.50 = $2.50 |
| May 1 | 2 | 3 | 6 | 5 * 0.25 = 1.25~1 | 1 * $0.50 = $0.50 |
| May 1 | 2 | 3 | 10 | 3 | 3 * $0.50 = $1.50 |
| May 1 | 2 | 3 | 10 | 3 * 0.25 = 1.25~1 | 1 * $0.50 = $0.50 |
| | | May 1 Totals: | | 10 | $5.00 |
| May 2 | 2 | 3 | 6 | 5 | 5 * $0.50 = $2.50 |
| May 2 | 2 | 3 | 6 | 5 * 0.25 = 1.25~1 | 1 * $0.50 = $0.50 |
| May 2 | 2 | 3 | 10 | 4 | 4 * $0.50 = $2.00 |
| May 2 | 2 | 3 | 10 | 4 * 0.25 = 1 | 1 * $0.50 = $0.50 |
| | | May 2 Totals: | | 11 | $5.50 |
| May 3 | 2 | 3 | 6 | 5 | 5 * $0.50 = $2.50 |
| May 3 | 2 | 3 | 6 | 5 * 0.25 = 1.25~1 | 1 * $0.50 = $0.50 |
| May 3 | 2 | 3 | 10 | 2 | 2 * $0.50 = $1.00 |
| May 3 | 2 | 3 | 10 | 2 * 0.25 = 0.5~1 | 1 * $0.50 = $0.50 |
| | | May 3 Totals: | | 9 | $4.50 |
| May 4 | 2 | 3 | 6 | 5 | 5 * $0.50 = $2.50 |
| May 4 | 2 | 3 | 6 | 5 * 0.25 = 1.25~1 | 1 * $0.50 = $0.50 |
| May 4 | 2 | 3 | 10 | 3 | 3 * $0.50 = $1.50 |
| May 4 | 2 | 3 | 10 | 3 * 0.25 = 1.25~1 | 1 * $0.50 = $0.50 |
| | | May 4 Totals: | | 10 | $5.00 |
| May 5 | 2 | 3 | 6 | 4 | 4 * $0.50 = $2.00 |
| May 5 | 2 | 3 | 6 | 4 * 0.25 = 1 | 1 * $0.50 = $0.50 |
| May 5 | 2 | 3 | 10 | 4 | 4 * $0.50 = $2.00 |
| May 5 | 2 | 3 | 10 | 4 * 0.25 = 1 | 1 * $0.50 = $0.50 |
| | | May 5 Totals: | | 10 | $5.00 |
| | | May 1-5 Totals: | | 50 | $20.00 |

The adjusted network table shows that 50 clicks have been accounted for. A total of $2.50 received by the transaction management system 100 from the HeadClick advertiser is paid to the BigNews publisher; likewise a total of $2.50 received by the transaction management system 100 from the HeadClick advertiser is paid to the Hambone ad network.

(3) One-Day Adjustment with Conversion Units

An advertiser called HeadClick (id 1), within an ad network called HeadNet (id 2), has a line_item (id 3) with the transaction management system 100 that is a cost-per-action (CPA) deal for a particular ad creative ("ad creative P"). The conversion (id 4) is a magazine subscription. According to the CPA deal, each time a consumer converts the ad creative P by subscribing to the magazine, HeadClick pays $2.50 to the transaction management system 100.

On May 1, 2006, the ad creative P was served on two different websites: a publisher called BigNews (id 5, line_item id 6) within the HeadNet ad network, and a publisher called EasySearch (id 7, line_item 8) within an ad network called Hambone (id 9). There is a line_item (id 10) allowing the HeadNet ad network to send traffic to the Hambone ad network. The accounting application 118 recorded a total of 50 conversions on the ad creative P for May 1, 2006. Specifically, the accounting application tracked the number of times consumers converted the ad creative P and generated a network table as shown below (N=Ad network; B=Buyer; S=Seller):

| Day | N (id) | B (id) | S (id) | Conversions | Rev |
|---|---|---|---|---|---|
| May 1 | 2 | 3 | 6 | 30 | 30 * $2.00 = $60.00 |
| May 1 | 2 | 3 | 10 | 20 | 20 * $2.00 = $40.00 |
| | | May 1 Totals: | | 50 | $100.00 |

Even though the accounting application 118 recorded a total of 50 conversions for May 1, the HeadClick advertiser recorded 40 conversions for this date. A user (e.g., an employee associated with the HeadClick advertiser or the transaction management system 100) enters a request for an adjustment with click units and a value of 40 through a user interface provided by the accounting application 118.

Once the adjustment request is entered, the accounting application 118 performs a series of computations to determine how the deficit of $20.00 ($80.00−$100.00) is to be distributed amongst the various business entities that functioned as buyers with respect to the HeadNet ad network during the various transactions involving the ad creative P. In this example, the transaction management system 100 only distributes the deficit amongst the business entities that belong to the HeadNet ad network, that is, BigNews publisher and Hambone ad network. The deficit is not distributed to the EasySearch publisher that belongs to the Hambone ad network.

The accounting application 118 first computes the weighted adjustment as follows: weighted adjustment=(# of HeadClick-recorded conversions−# of TMS-recorded conversions)/(# of TMS-recorded conversions)=(40−50)/50=−10/50=−0.2

The accounting application 118 then computes the adjustments to be made per business entity within the HeadNet ad network on a given day using the weighted adjustment and rounds each result up or down as follows: if the fraction of the result is greater than or equal to 0.5 and the whole number of the fraction is an odd number, round down; if the fraction of the result is greater than or equal to 0.5 and the whole number of the fraction is an even number, round up; if the fraction of the result is less than 0.5 and the whole number of the fraction is an odd number, round down; if the fraction of the result is less than 0.5 and the whole number of the fraction is an even number, round up. After the adjustments and rounding, the accounting application generates an adjusted network table as shown below:

| Day | N (id) | B (id) | S (id) | Clicks | Rev |
|---|---|---|---|---|---|
| May 1 | 2 | 3 | 6 | 30 | 30 * $2.00 = $60.00 |
| May 1 | 2 | 3 | 6 | 30 * −0.2 = −6 | −6 * $2.00 = −$12.00 |
| May 1 | 2 | 3 | 10 | 20 | 20 * $2.00 = $40.00 |
| May 1 | 2 | 3 | 10 | 20 * −0.2 = −4 | −4 * $2.00 = −$8.00 |
| | | | May 1 Totals: | 30 − 6 + 20 − 4 = 40 | $80.00 |

The adjusted network table shows that 40 conversions have been accounted for. The transaction management system 100 has to obtain $12.00 from the BigNews publisher to pass on to the HeadClick advertiser; transaction management system 100 has to obtain $8.00 from the Hambone ad network to pass on to the HeadClick advertiser.

(4) Five-Day Adjustment with Conversion Units

An advertiser called HeadClick (id 1), within an ad network called HeadNet (id 2), has a line_item (id 3) with the transaction management system 100 that is a cost-per-action (CPA) deal for a particular ad creative ("ad creative Q"). The conversion (id 4) is a magazine subscription. According to the CPA deal, each time a consumer converts the ad creative Q by subscribing to the magazine, HeadClick pays $2.00 to the transaction management system 100.

On May 1, 2006 through May 5, 2006, inclusive, the ad creative Q was served on two different websites: a publisher called BigNews (id 5, line_item id 6) within the HeadNet ad network, and a publisher called EasySearch (id 7, line_item 8) within an ad network called Hambone (id 9). There is a line_item (id 10) allowing the HeadNet ad network to send traffic to the Hambone ad network. The accounting application 118 recorded a total of 100 conversions on the ad creative Q for the period starting with May 1, 2006 and ending with May 5, 2006, inclusive. Specifically, the accounting application tracked the number of times consumers converted the ad creative Q and generated a network table as shown below (N=Ad network; B=Buyer; S=Seller):

| Day | N (id) | B (id) | S (id) | Conversions | Rev |
|---|---|---|---|---|---|
| May 1 | 2 | 3 | 6 | 12 | 12 * $2.00 = $24.00 |
| May 1 | 2 | 3 | 10 | 8 | 8 * $2.00 = $16.00 |
| | | | May 1 Totals: | 20 | $40.00 |
| May 2 | 2 | 3 | 6 | 14 | 14 * $2.00 = $28.00 |
| May 2 | 2 | 3 | 10 | 10 | 10 * $2.00 = $20.00 |
| | | | May 2 Totals: | 24 | $48.00 |
| May 3 | 2 | 3 | 6 | 6 | 6 * $2.00 = $12.00 |
| May 3 | 2 | 3 | 10 | 10 | 10 * $2.00 = $20.00 |
| | | | May 3 Totals: | 16 | $32.00 |
| May 4 | 2 | 3 | 6 | 12 | 12 * $2.00 = $24.00 |
| May 4 | 2 | 3 | 10 | 8 | 8 * $2.00 = $16.00 |
| | | | May 4 Totals: | 20 | $40.00 |
| May 5 | 2 | 3 | 6 | 10 | 10 * $2.00 = $20.00 |
| May 5 | 2 | 3 | 10 | 10 | 10 * $2.00 = $20.00 |
| | | | May 5 Totals: | 20 | $40.00 |
| | | | May 1-5 Totals: | 100 | $200.00 |

Even though the accounting application 118 recorded a total of 100 conversions for May 1, the HeadClick advertiser recorded 80 conversions for this date. A user (e.g., an employee associated with the HeadClick advertiser or the transaction management system 100) enters a request for an adjustment with click units and a value of 80 through a user interface provided by the accounting application 118.

Once the adjustment request is entered, the accounting application 118 performs a series of computations to determine how the deficit of $40.00 ($160.00−$200.00) is to be distributed amongst the various business entities that functioned as buyers with respect to the HeadNet ad network during the various transactions involving the ad creative P. In this example, the transaction management system 100 only distributes the deficit amongst the business entities that belong to the HeadNet ad network, that is, BigNews publisher and Hambone ad network. The deficit is not distributed to the EasySearch publisher that belongs to the Hambone ad network.

The accounting application 118 first computes the weighted adjustment as follows: weighted adjustment=(# of HeadClick-recorded conversions−# of TMS-recorded conversions)/(# of TMS-recorded conversions)=(80−100)/100=−20/100=−0.2

The accounting application 118 then computes the adjustments to be made per business entity within the HeadNet ad network on a given day using the weighted adjustment and rounds each result up or down as follows: if the fraction of the result is greater than or equal to 0.5 and the whole number of the fraction is an odd number, round down; if the fraction of the result is greater than or equal to 0.5 and the whole number of the fraction is an even number, round up; if the fraction of the result is less than 0.5 and the whole number of the fraction is an odd number, round down; if the fraction of the result is less than 0.5 and the whole number of the fraction is an even number, round up. After the adjustments and rounding, the accounting application generates an adjusted network table as shown below:

| Day | N (id) | B (id) | S (id) | Conversions | Rev |
|---|---|---|---|---|---|
| May 1 | 2 | 3 | 6 | 12 | 12 * $2.00 = $24.00 |
| May 1 | 2 | 3 | 6 | 12 * −0.2 = −2.4~−2 | −2 * $2.00 = −$4.00 |
| May 1 | 2 | 3 | 10 | 8 | 8 * $2.00 = $16.00 |
| May 1 | 2 | 3 | 10 | 8 * −0.2 = −1.6~−2 | −2 * $2.00 = −$4.00 |
| | | | May 1 Totals: | 16 | $32.00 |
| May 2 | 2 | 3 | 6 | 14 | 14 * $2.00 = $28.00 |
| May 2 | 2 | 3 | 6 | 14 * −0.2 = −2.8~−3 | −3 * $2.00 = −$6.00 |
| May 2 | 2 | 3 | 10 | 10 | 10 * $2.00 = $20.00 |
| May 2 | 2 | 3 | 10 | 10 * −0.2 = −2 | −2 * $2.00 = −$4.00 |
| | | | May 2 Totals: | 19 | $38.00 |

-continued

| Day | N (id) | B (id) | S (id) | Conversions | Rev |
|---|---|---|---|---|---|
| May 3 | 2 | 3 | 6 | 6 | 6 * $2.00 = $12.00 |
| May 3 | 2 | 3 | 6 | 6 * −0.2 = −1.2~−1 | −1 * $2.00 = −$2.00 |
| May 3 | 2 | 3 | 10 | 10 | 10 * $2.00 = $20.00 |
| May 3 | 2 | 3 | 10 | 10 * −0.2 = −2 | −2 * $2.00 = −$4.00 |
| | | | May 3 Totals: | 13 | $26.00 |
| May 4 | 2 | 3 | 6 | 12 | 12 * $2.00 = $24.00 |
| May 4 | 2 | 3 | 6 | 12 * −0.2 = −2.4~−2 | −2 * $2.00 = −$4.00 |
| May 4 | 2 | 3 | 10 | 8 | 8 * $2.00 = $16.00 |
| May 4 | 2 | 3 | 10 | 8 * −0.2 = −1.6~−2 | −2 * $2.00 = −$4.00 |
| | | | May 4 Totals: | 16 | $32.00 |
| May 5 | 2 | 3 | 6 | 10 | 10 * $2.00 = $20.00 |
| May 5 | 2 | 3 | 6 | 10 * −0.2 = −2 | −2 * $2.00 = −$4.00 |
| May 5 | 2 | 3 | 10 | 10 | 10 * $2.00 = $20.00 |
| May 5 | 2 | 3 | 10 | 10 * −0.2 = −2 | −2 * $2.00 = −$4.00 |
| | | | May 5 Totals: | 16 | $32.00 |
| | | | May 1-5 Totals: | 80 | $160.00 |

The adjusted network table shows that 80 conversions have been accounted for. The transaction management system 100 has to obtain $20.00 from the BigNews publisher to pass on to the HeadClick advertiser; transaction management system 100 has to obtain $20.00 from the Hambone ad network to pass on to the HeadClick advertiser.

(5) Five-Day Adjustment with Conversion Units

An advertiser called HeadClick (id 1), within an ad network called HeadNet (id 2), has a line_item (id 3) with the transaction management system 100 that is a cost-per-action (CPA) deal for a particular ad creative ("ad creative Q"). The conversion (id 4) is a magazine subscription. According to the CPA deal, each time a consumer converts the ad creative Q by subscribing to the magazine, HeadClick pays $2.50 to the transaction management system 100.

On May 1, 2006 through May 5, 2006, inclusive, the ad creative Q was served on two different websites: a publisher called BigNews (id 5, line_item id 6) within the HeadNet ad network, and a publisher called EasySearch (id 7, line_item 8) within an ad network called Hambone (id 9). There is a line_item (id 10) allowing the HeadNet ad network to send traffic to the Hambone ad network. The accounting application 118 recorded a total of 100 conversions on the ad creative Q for the period starting with May 1, 2006 and ending with May 5, 2006, inclusive. Specifically, the accounting application tracked the number of times consumers converted the ad creative Q and generated a network table as shown below (N=Ad network; B=Buyer; S=Seller):

| Day | N (id) | B (id) | S (id) | Conversions | Rev |
|---|---|---|---|---|---|
| May 1 | 2 | 3 | 6 | 12 | 12 * $2.00 = $24.00 |
| May 1 | 2 | 3 | 10 | 8 | 8 * $2.00 = $16.00 |
| | | | May 1 Totals: | 20 | $40.00 |
| May 2 | 2 | 3 | 6 | 14 | 14 * $2.00 = $28.00 |
| May 2 | 2 | 3 | 10 | 10 | 10 * $2.00 = $20.00 |
| | | | May 2 Totals: | 24 | $48.00 |
| May 3 | 2 | 3 | 6 | 9 | 9 * $2.00 = $18.00 |
| May 3 | 2 | 3 | 10 | 8 | 8 * $2.00 = $16.00 |
| | | | May 3 Totals: | 17 | $34.00 |
| May 4 | 2 | 3 | 6 | 12 | 12 * $2.00 = $24.00 |
| May 4 | 2 | 3 | 10 | 8 | 8 * $2.00 = $16.00 |
| | | | May 4 Totals: | 20 | $40.00 |
| May 5 | 2 | 3 | 6 | 10 | 10 * $2.00 = $20.00 |
| May 5 | 2 | 3 | 10 | 9 | 9 * $2.00 = $18.00 |
| | | | May 5 Totals: | 19 | $38.00 |
| | | | May 1-5 Totals: | 100 | $200.00 |

Even though the accounting application 118 recorded a total of 100 conversions for May 1, the HeadClick advertiser recorded 80 conversions for this date. A user (e.g., an employee associated with the HeadClick advertiser or the transaction management system 100) enters a request for an adjustment with click units and a value of 80 through a user interface provided by the accounting application 118.

Once the adjustment request is entered, the accounting application 118 performs a series of computations to determine how the deficit of $40.00 ($160.00−$200.00) is to be distributed amongst the various business entities that functioned as buyers with respect to the HeadNet ad network during the various transactions involving the ad creative P. In this example, the transaction management system 100 only distributes the deficit amongst the business entities that belong to the HeadNet ad network, that is, BigNews publisher and Hambone ad network. The deficit is not distributed to the EasySearch publisher that belongs to the Hambone ad network.

The accounting application 118 first computes the weighted adjustment as follows: weighted adjustment=(# of HeadClick-recorded conversions−# of TMS-recorded conversions)/(# of TMS-recorded conversions)=(80−100)/100=−20/100=−0.2.

The accounting application 118 first computes the adjustments to be made per day using the weighted adjustment and rounds each result up or down as follows: if the fraction of the result is greater than or equal to 0.5 and the whole number of the fraction is an odd number, round down; if the fraction of the result is greater than or equal to 0.5 and the whole number of the fraction is an even number, round up; if the fraction of the result is less than 0.5 and the whole number of the fraction is an odd number, round down; if the fraction of the result is less than 0.5 and the whole number of the fraction is an even number, round up.
May 1 existing total: 20*−0.2=−4
May 2 existing total: 24*−0.2=−4.8~−5
May 3 existing total: 17*−0.2=−3.4~−3
May 4 existing total: 20*−0.2=−4
May 5 existing total: 19*−0.2=−3.8~−4

The accounting application 118 then computes the adjustments to be made per business entity within the HeadNet ad network on a given day using the weighted adjustment and rounds each result up or down as follows: if the fraction of the result is greater than or equal to 0.5 and the whole number of the fraction is an odd number, round down; if the fraction of the result is greater than or equal to 0.5 and the whole number of the fraction is an even number, round up; if the fraction of the result is less than 0.5 and the whole number of the fraction is an odd number, round down; if the fraction of the result is less than 0.5 and the whole number of the fraction is an even number, round up. After the adjustments and rounding, the accounting application generates an adjusted network table as shown below:

| Day | N (id) | B (id) | S (id) | Conversions | Rev |
|---|---|---|---|---|---|
| May 1 | 2 | 3 | 6 | 12 | 12 * $2.00 = $24.00 |
| May 1 | 2 | 3 | 6 | 12 * −0.2 = −2.4~−2 | −2 * $2.00 = −$4.00 |
| May 1 | 2 | 3 | 10 | 8 | 8 * $2.00 = $16.00 |
| May 1 | 2 | 3 | 10 | 8 * −0.2 = −1.6~−2 | −2 * $2.00 = −$4.00 |
| | | | May 1 Totals: | 16 | $32.00 |
| May 2 | 2 | 3 | 6 | 14 | 14 * $2.00 = $28.00 |
| May 2 | 2 | 3 | 6 | 14 * −0.2 = −2.8~−3 | −3 * $2.00 = −$6.00 |
| May 2 | 2 | 3 | 10 | 10 | 10 * $2.00 = $20.00 |
| May 2 | 2 | 3 | 10 | 10 * −0.2 = −2 | −2 * $2.00 = −$4.00 |
| | | | May 2 Totals: | 19 | $38.00 |
| May 3 | 2 | 3 | 6 | 9 | 9 * $2.00 = $18.00 |
| May 3 | 2 | 3 | 6 | 9 * −0.2 = −1.8~−2 | −2 * $2.00 = −$4.00 |
| May 3 | 2 | 3 | 10 | 8 | 8 * $2.00 = $16.00 |
| May 3 | 2 | 3 | 10 | 8 * −0.2 = −1.6~−2 | −2 * $2.00 = −$4.00 |
| | | | May 3 Totals: | 13 | $26.00 |
| May 4 | 2 | 3 | 6 | 12 | 12 * $2.00 = $24.00 |
| May 4 | 2 | 3 | 6 | 12 * −0.2 = −2.4~−2 | −2 * $2.00 = −$4.00 |
| May 4 | 2 | 3 | 10 | 8 | 8 * $2.00 = $16.00 |
| May 4 | 2 | 3 | 10 | 8 * −0.2 = −1.6~−2 | −2 * $2.00 = −$4.00 |
| | | | May 4 Totals: | 16 | $32.00 |
| May 5 | 2 | 3 | 6 | 10 | 10 * $2.00 = $20.00 |
| May 5 | 2 | 3 | 6 | 10 * −0.2 = −2 | −2 * $2.00 = −$4.00 |
| May 5 | 2 | 3 | 10 | 9 | 9 * $2.00 = $18.00 |
| May 5 | 2 | 3 | 10 | 9 * −0.2 = −1 | −1 * $2.00 = −$2.00 |
| | | | May 5 Totals: | 16 | $32.00 |
| | | | May 1-5 Totals: | 80 | $160.00 |

The adjusted network table shows that 80 conversions have been accounted for. However, it should be noted that the accounting application 118 expects a 3 conversion deficit on May 3 (based on the adjustment per day computation), whereas the adjusted network table above shows a 4 conversion deficit on May 3 (based on the adjustment per entity per day computation). The accounting application 118 issues a reconciliation of +1 for the HeadNet ad network on May 3, resulting in the following reconciled adjusted network table:

| Day | N (id) | B (id) | S (id) | Conversions | Rev |
|---|---|---|---|---|---|
| May 1 | 2 | 3 | 6 | 12 | 12 * $2.00 = $24.00 |
| May 1 | 2 | 3 | 6 | 12 * −0.2 = −2.4~−2 | −2 * $2.00 = −$4.00 |
| May 1 | 2 | 3 | 10 | 8 | 8 * $2.00 = $16.00 |
| May 1 | 2 | 3 | 10 | 8 * −0.2 = −1.6~−2 | −2 * $2.00 = −$4.00 |
| | | | May 1 Totals: | 16 | $32.00 |
| May 2 | 2 | 3 | 6 | 14 | 14 * $2.00 = $28.00 |
| May 2 | 2 | 3 | 6 | 14 * −0.2 = −2.8~−3 | −3 * $2.00 = −$6.00 |
| May 2 | 2 | 3 | 10 | 10 | 10 * $2.00 = $20.00 |
| May 2 | 2 | 3 | 10 | 10 * −0.2 = −2 | −2 * $2.00 = −$4.00 |
| | | | May 2 Totals: | 19 | $38.00 |

-continued

| Day | N (id) | B (id) | S (id) | Conversions | Rev |
|---|---|---|---|---|---|
| May 3 | 2 | 3 | 6 | 9 | 9 * $2.00 = $18.00 |
| May 3 | 2 | 3 | 6 | 9 * −0.2 = −1.8~−2 | −2 * $2.00 = −$4.00 |
| May 3 | 2 | 3 | 10 | 8 | 8 * $2.00 = $16.00 |
| May 3 | 2 | 3 | 10 | 8 * −0.2 = −1.6~−2 | −2 * $2.00 = −$4.00 |
| May 3 | 2 | 3 | −2 | 1 | 1 * $2.00 = $2.00 |
| | | May 3 Totals: | | 14 | $28.00 |
| May 4 | 2 | 3 | 6 | 12 | 12 * $2.00 = $24.00 |
| May 4 | 2 | 3 | 6 | 12 * −0.2 = −2.4~−2 | −2 * $2.00 = −$4.00 |
| May 4 | 2 | 3 | 10 | 8 | 8 * $2.00 = $16.00 |
| May 4 | 2 | 3 | 10 | 8 * −0.2 = −1.6~−2 | −2 * $2.00 = −$4.00 |
| | | May 4 Totals: | | 16 | $32.00 |
| May 5 | 2 | 3 | 6 | 10 | 10 * $2.00 = $20.00 |
| May 5 | 2 | 3 | 6 | 10 * −0.2 = −2 | −2 * $2.00 = −$4.00 |
| May 5 | 2 | 3 | 10 | 9 | 9 * $2.00 = $18.00 |
| May 5 | 2 | 3 | 10 | 9 * −0.21 = −1 | −1 * $2.00 = −$2.00 |
| | | May 5 Totals: | | 16 | $32.00 |
| | | May 1-5 Totals: | | 81 | $162.00 |

The transaction management system 100 has to obtain $20.00 from the BigNews publisher to pass on to the HeadClick advertiser; transaction management system 100 has to obtain $20.00 from the Hambone ad network to pass on to the HeadClick advertiser.

Although the examples provided above describe certain rounding techniques (e.g., if the fraction of the result is greater than or equal to 0.5 and the whole number of the fraction is an odd number, round down; if the fraction of the result is greater than or equal to 0.5 and the whole number of the fraction is an even number, round up; if the fraction of the result is less than 0.5 and the whole number of the fraction is an odd number, round down; if the fraction of the result is less than 0.5 and the whole number of the fraction is an even number, round up), other rounding techniques may also be applied. One example rounding technique that may be used in a multi-day adjustment process involves rounding the values down until the sum of the remainders is more than 1, then rounding up. On the last day of the multi-day adjustment process, the rounding technique involves adding the remainders to the current number and rounding down. The remainder is then added to a "slough" account so that the overall number ties out at the end of the day.

Although the transaction management system 100 is described as adjusting revenue based on units of impressions, clicks, conversions, and revenue, the system may be implemented to adjust revenue based on any arbitrary unit, and in some discretionary pricing models, independent of any unit.

In addition to the revenue adjustment process, the transaction management system 100 may also implement a delivery mechanism that accounts for any revenue adjustments. As an example, if a 5% positive adjustment is made to a $1.00 CPM campaign, the transaction management system 100 will optimize the campaign as if it would get $1.05 CPM. The transaction management system 100 pays the ad networks as if it were a $1.05 CPM deal, but book it for itself and its managed publishers at $1.00 so that the manual adjustment flows through properly.

Although the techniques are described above in the online advertising context, the techniques are also applicable in any number of different electronic exchanges in which products, commodities or services are offered for purchase or sale.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer 110 having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results.

What is claimed is:

1. In a system that provides an open exchange environment to connect business entities through a network, a computer-implemented method comprising:
    at a server computer, receiving an adjustment request from a business entity to distribute one of a revenue surplus or a revenue deficit for a predefined time interval;
    at the server computer, in response to the revenue adjustment request, performing a revenue adjustment process to distribute the one of a revenue surplus or a revenue deficit among business entity involved in one or more transactions from which the one of the revenue surplus or the revenue deficit originates over the predefined time interval, each of the one or more transactions involving an online advertisement creative to be displayed on a web page associated with one of the business entities and wherein
    the business entities involved in the one or more transactions include
        an advertiser,
        one or more advertisement networks, and
        one or more publishers;
    including
        at the server computer, determining an amount of activity measured by the system as an amount of activity related to the online advertisement creative during the predefined time interval, and wherein
    the revenue adjustment request includes an advertiser-measured amount of activity associated with the online advertisement creative over the predefined time interval, the one of a revenue surplus or deficit being based on a difference between
    the amount of activity measured by the system during the predefined time interval and
    advertiser-measured amount of activity associated with the online advertisement creative over the predefined time interval, and
    at the server computer, determining a proportion of the one of the revenue surplus or the revenue deficit to which each business entity of the one or more business entities involved in the one or more transactions is distributed.

2. The method of claim 1, wherein: the advertiser has a relationship with a first of the one or more advertisement networks, the relationship being defined in part by a line item related to an online advertisement creative being offered for display on a web page.

3. The method of claim 2, wherein the line item comprises a unit price for the online advertisement creative, the unit price being adjusted based on one of the following units: impressions, clicks, conversions, and revenue.

4. The method of claim 2, wherein: at least one of the one or more publishers has a relationship with the first of the one or more advertisement networks, the relationship being defined in part by a line item related to an online advertisement space of a web page.

5. The method of claim 2, wherein: at least one of the one or more publishers has a relationship with a second of the one or more advertisement networks, the relationship being defined in part by a line item related to an online advertisement space of a web page.

6. the method of claim 5, wherein identifying the set of business entities comprises:
    excluding, from the set of business entities to which the one of the revenue surplus or the revenue deficit is to be distributed, any publisher that has an exclusive relationship with the second of the one or more advertisement networks.

7. The method of claim 1, wherein the system-measured amount of activity is expressed as a value with a unit identifier, the unit identifier being based on one of the following: impressions, clicks, conversions, and revenue.

8. The method of claim 1, further comprising:
    at the server computer, receiving the revenue adjustment request from an advertiser associated with the online advertisement creative.

9. the method of claim 1, wherein each of the one or more transactions involves a particular product, commodity or service that is being offered for purchase or sale by a first of the business entities.

10. the method of claim 9, further comprising:
    identifying the system-measured aggregate amount of activity associated with the particular product, commodity or service over the predefined time interval.

11. the method of claim 9, further comprising:
    measuring, by the system, the amount of activity associated with the particular product, commodity or service for each of the business entities of the set over each of one or more portions of the predefined time interval.

12. The method of claim 9, further comprising:
    at the server computer, receiving a revenue adjustment request from the first of the business entities, the revenue adjustment request identifying a first-entity-measured aggregate amount of activity associated with the particular product, commodity or service over the predefined time interval.

13. the method of claim 9, wherein determining a proportion of the one of the revenue surplus or the revenue deficit to which each business entity of the set is distributed comprises:
calculating a weighted adjustment; and
for each business entity, generating an interval-based activity amount disparity by applying the weighted adjustment to the system-measured amount of activity associated with the particular product, commodity or service for that business entity during each of the one or more portions of the predefined time interval; and
determining the proportion of the one of the revenue surplus or the revenue deficit to which the business entity is distributed based on the interval-based activity amount disparity generated for each of the one or more portions of the predefined time interval.

14. a non-transitory machine-readable medium that stores executable instructions to cause a machine in a system that provides an open exchange environment to connect business entities through a network to:
in response to a received adjustment request from a business entity to distribute one of a revenue surplus or a revenue deficit, the one of a revenue surplus or deficit being based on a difference between an amount of activity measured by the business entity over a predefined time interval and an amount of activity measured by the system over the predefined time interval, perform a revenue adjustment process to distribute the one of a revenue surplus or a revenue deficit among each business entity involved in one or more transactions from which the one of the revenue surplus or the revenue deficit originates over the predefined time interval, each of the one or more transactions involving an online advertisement creative to be displayed on a web page associated with one of the business entities,
the business entities involved in the one or more transactions include
an advertiser,
one or more advertisement networks, and
one or more publishers,
the instructions to perform the revenue adjustment process including instructions to:
determine an amount of activity measured by the system as an amount of activity related to the online advertisement creative during the predefined time interval, wherein
the revenue adjustment request includes an advertiser-measured amount of activity associated with the online advertisement creative over the predefined time interval, the one of a revenue surplus or deficit being based on a difference between the amount of activity measured by the system during the predefined time interval, and advertiser-measured amount of activity associated with the online advertisement creative over the predefined time interval,
determine a proportion of the one of the revenue surplus or the revenue deficit to which each business entity of the set is distributed.

15. The non-transitory machine-readable medium of claim 14, wherein:
the advertiser has a relationship with a first of the one or more advertisement networks, the relationship being defined in part by a line item related to an online advertisement creative being offered for display on a web page.

16. the non-transitory machine-readable medium of claim 15, wherein the line item comprises a unit price for the online advertisement creative, the unit price being adjusted based on one of the following units: impressions, clicks, conversions, and revenue.

17. The non-transitory machine-readable medium of claim 15 wherein at least one of the one or more publishers has a relationship with the first of the one or more advertisement networks, the relationship being defined in part by a line item related to an online advertisement space of a web page.

18. The non-transitory machine-readable medium of claim 15 wherein at least one of the one or more publishers has a relationship with a second of the one or more advertisement networks, the relationship being defined in part by a line item related to an online advertisement space of a web page.

19. The non-transitory machine-readable medium of claim 18, wherein the instructions to identify the set of business entities comprises instructions to:
exclude, from the set of business entities to which the one of the revenue surplus or the revenue deficit is to be distributed, any publisher that has an exclusive relationship with the second of the one or more advertisement networks.

20. The non-transitory machine-readable medium of claim 14, wherein the system-measured amount of activity is expressed as a value with a unit identifier, the unit identifier being based on one of the following: impressions, clicks, conversions, and revenue.

21. The non-transitory machine-readable medium of claim 14, further comprising instructions to:
receive a request for a revenue adjustment from an advertiser associated with the online advertisement creative.

22. The non-transitory machine-readable medium of claim 21, wherein the revenue adjustment request provides an advertiser-measured amount of activity as the amount of activity measured by the business entity, associated with the online advertisement creative over the predefined time interval, expressed as a value with a unit identifier, the unit identifier being based on one of the following:
impressions, clicks, conversions, and revenue.

23. The machine-readable medium of claim 14, wherein each of the one or more transactions involves a particular product, commodity or service that is being offered for purchase or sale by a first of the business entities.

24. the non-transitory machine-readable medium of claim 23, further comprising instructions to:
identify a system-measured aggregate amount of activity associated with the particular product, commodity or service over the predefined time interval.

25. The non-transitory machine-readable medium of claim 23, further comprising instructions to:
measure, by the system, as the amount of activity measured by the system, the amount of activity associated with the particular product, commodity or service for each of the business entities of the set over each of one or more portions of the predefined time interval.

26. The non-transitory machine-readable medium of claim 23, further comprising instructions to:
receive a request for a revenue adjustment from the first of the business entities, the revenue adjustment request identifying a first-entity-measured aggregate amount of activity associated with the particular product, commodity or service over the predefined time interval.

27. The non-transitory machine-readable medium of claim 23, wherein instructions to determine a proportion of the one of the revenue surplus or the revenue deficit to which each business entity of the set is distributed comprises instructions to: calculate a weighted adjustment; and for each business entity, generate an interval-based activity amount disparity by applying the weighted adjustment to a system-measured amount of activity associated with the particular product, commodity or service for that business entity during each of the one or more portions of the predefined time interval; and determine the proportion of the one of the revenue surplus or the revenue deficit to which the business entity is distributed based on the interval-based activity amount disparity generated for each of the one or more portions of the predefined time interval.

28. The non-transitory method of claim 1, wherein receiving the revenue adjustment request comprises receiving information defining the predetermined time interval.

29. The non-transitory machine-readable medium of claim 14, wherein the received adjustment request comprises the predetermined time interval.

* * * * *